United States Patent
McCray et al.

(10) Patent No.: US 10,570,578 B2
(45) Date of Patent: Feb. 25, 2020

(54) BIOHYDROCHEMICAL ENHANCEMENT STRUCTURE FOR STREAM-WATER TREATMENT

(71) Applicant: Colorado School of Mines, Golden, CO (US)

(72) Inventors: John McCray, Golden, CO (US); Skuyler Herzog, Golden, CO (US); Chris Higgins, Golden, CO (US)

( * ) Notice: Subject to any disclaimer, the term of this patent is extended or adjusted under 35 U.S.C. 154(b) by 680 days.

(21) Appl. No.: 14/715,088

(22) Filed: May 18, 2015

(65) Prior Publication Data

US 2015/0337511 A1    Nov. 26, 2015

Related U.S. Application Data

(60) Provisional application No. 62/000,265, filed on May 19, 2014.

(51) Int. Cl.
*E02B 3/02* (2006.01)
*C02F 1/28* (2006.01)
*E02B 5/00* (2006.01)

(52) U.S. Cl.
CPC .................... *E02B 5/00* (2013.01)

(58) Field of Classification Search
CPC .......... E02B 3/023; C02F 1/281; C02F 1/283; C02F 1/285; C02F 1/286; C02F 1/288
USPC .................... 210/170.03, 170.1, 747.2, 747.3
See application file for complete search history.

(56) References Cited

U.S. PATENT DOCUMENTS

| 3,854,291 A * | 12/1974 | Perkins | .................. E02B 8/023 210/170.1 |
| 2015/0321927 A1* | 11/2015 | McWayne | ............... C02F 1/283 210/767 |

OTHER PUBLICATIONS

Azinheira, David L. et al., "Comparison of effects of inset floodplains and hyporheic exchange induced by in-stream structures on solute retention", Water Resour. Res., vol. 50; doi:10.1002/2013WR014400., 2014, pp. 6168-6190.

Fox, Aryeh et al., "Impact of losing and gaining streamflow conditions on hyporheic exchange fluxes induced by dune-shaped bed forms", Water Resour. Res., vol. 50, 2014, pp. 1895-1907.

(Continued)

*Primary Examiner* — Sunil Singh
(74) *Attorney, Agent, or Firm* — Dorsey & Whitney LLP

(57) ABSTRACT

Novel streamwater remediation systems and processes are presented. The disclosed systems involve design and placement of geometric volumes of porous media of variable hydraulic conductivity within the streambed to enhance hyporheic exchange (exchange of water from the stream or constructed urban waterway compartment to the porous media, or streambed, compartment). The disclosed systems may help improve water quality in various ways, for example through the removal of contaminants from water as it passes through the streambed. In some embodiments, contaminant removal is achieved by microbes and/or reactive geomedia incorporated into the streambed structures. By pairing hydrologic/flow structures with bacteria or reactive geomedia, diverse contaminants such as metals, nutrients, organics, pathogens, and more can be sorbed, deactivated, assimilated, transformed to harmless chemicals, and otherwise removed from the water. Because the structures are designed to return water to the stream after treatment, the stream water quality is improved by the structures.

17 Claims, 10 Drawing Sheets

(56) References Cited

OTHER PUBLICATIONS

Fuller, Christopher C. et al., "Processes of zinc attenuation by biogenic manganese oxides forming in the hyporheic zone of Pinal Creek, Arizona", Environ Sci Technol.; vol. 48 No. 4; doi:10.1021/es402576f., Feb. 2014, pp. 2165-2172.

Grebel, Janel E. et al., "Engineered Infiltration Systems for Urban Stormwater Reclamation", Environmental Engineering Science; vol. 30, No. 8, 2013, pp. 437-454.

Harvey, Judson W. et al., "Hyporheic zone denitrification: Controls on effective reaction depth and contribution to whole-stream mass balance", Water Resources Research, vol. 49; doi:10.1002/wrcr.20492, 2013, pp. 6298-6316.

Menichino, Garrett T. et al., "Hydraulic and thermal effects of in-stream structure-induced hyporheic exchange across a range of hydraulic conductivities", Water Resour. Res., vol. 50; doi:10.1002/2013WR014758, 2014, pp. 4643-4661.

Trauth, Nico et al., "Hyporheic transport and biogeochemical reactions in pool-riffle systems under varying ambient groundwater flow conditions", J. Geophys. Res. Biogeosci., vol. 119; doi:10.1002/2013JG002586, 2014, pp. 910-928.

* cited by examiner

BIOHYDROCHEMICAL ENHANCEMENT STRUCTURE FOR STREAM-WATER TREATMENT

CROSS REFERENCE TO RELATED APPLICATIONS

This application claims benefit of priority pursuant to 35 U.S.C. § 119(e) of U.S. provisional patent application No. 62/000,265 filed May 19, 2014, which is incorporated herein by reference in its entirety.

STATEMENT REGARDING RESEARCH & DEVELOPMENT

Described examples were made with Government support under Government Contract Nos. EEC: 1028968 and GRFP: 1057607 awarded by the National Science Foundation. The Government has certain rights in the invention, including a paid-up license and the right, in limited circumstances, to require the owner of any patent issuing in this invention to license others on reasonable terms.

FIELD

The disclosed processes, methods, and systems are directed to the treatment of water to enhance water quality in streams or water flowing in constructed waterways, with little or no disruption of surface flow.

BACKGROUND

The role of the hyporheic zone (HZ; the saturated sediment region below and alongside the streambed) in biogeochemical cycling has been well documented in recent years, resulting in its designation as a river's liver. The streambed and bank sediments comprising the HZ provide diverse redox conditions, contact between solutes and microbes, and long residence times relative to surface water. This dynamic environment has been shown to support many reactions that can attenuate excess nutrients and anthropogenic contaminants from stormwater, recycled water, and non-point sources. These reactions include nitrification and denitrification, carbon cycling, pathogen mitigation, metal immobilization, and attenuation of organic micropollutants. Although the HZ can effectively improve the quality of water along hyporheic flowpaths, its contribution to reach-scale water quality is often transport-limited. In other words, large percentages of flow in natural systems tend to remain in the surface stream, bypassing potential treatment within the HZ. For example, denitrification has been measured within an HZ where small effects on stream nitrate concentrations were observed. In contrast, hyporheic denitrification in another stream has been shown to reduce stream nitrate levels by 10%, demonstrating that the HZ can significantly improve water quality under the right circumstances. Generally, the relevance of the HZ and in-stream biofilms is greatest in shallow, low-discharge streams where surface flow is minimized relative to hyporheic flow. However, even limited hyporheic flow over long distances may be effective at removing pollutants, although solute dynamics beyond the reach scale can be difficult to quantify.

Hyporheic exchange is caused by pressure gradients due to streambed hydraulic conductivity (K) heterogeneities, bedforms, woody debris, channel sinuosity, and topography. In-stream restoration studies have shown that cross-vane structures, bedforms, pool-and-riffle sequences, and woody debris added to channels can induce hyporheic flow.

Few studies have considered modifications to streambed K to improve circulation between surface water and hyporheic sediments. Relatively high K zones cause flow convergence, whereas flow diverges around relatively low K zones. In a streambed setting, these convergent and divergent flows can cause streamwater downwelling and hyporheic water upwelling, respectively.

Disclosed herein are methods and systems for modular streambed K modifications. These modifications are termed Biohydrochemical Enhancements structures for Streamwater Treatment (BEST), and may aid in promoting hyporheic exchanges and corresponding hyporheic residence times, without disrupting surface flow. By not disrupting the surface flow of water in the stream, the BEST module may reduce impact on stream residents, for example fish, and reduce regulatory impact, without altering stream aesthetics. In some embodiments, BEST modules are not visible because they are subsurface, while other restoration practices are visible and alter flow and sediment transport. BEST efficacy is evaluated for several combinations of in situ sediment K and slope, and the results are placed in the context of enhancing removal of various contaminants, for example pathogens and pathogen indicators, organic micropollutants, toxins, metals and the nutrients nitrogen (N) and phosphorous (P) from stream water or water in constructed waterways. Also disclosed is the use of geomedia, which may be natural or synthetic porous media, treated or untreated, reactive or non-reactive, that aids in the removal, modification, inactivation, or metabolism of contaminants. BEST may be used in urban or agricultural channels, where BEST modules comprising a combination of native sediments and reactive porous media may help to remove these and other contaminants derived from storm water runoff, recycled water, irrigation return flow, or natural waters.

SUMMARY

Disclosed herein is an engineered streambed module, positioned below the stream surface comprising: an upstream block of low hydraulic material; a downstream block of low hydraulic material; and at least one intermediate block positioned between the upstream bock and the downstream block, wherein the upstream blocks (low conductivity) have a hydraulic conductivity less than the hydraulic conductivity of a native streambed, intended to receive the module, and the intermediate block comprising native streambed material and/or material with a hydraulic conductivity that is similar to or greater (high conductivity) than that of the native streambed. In some cases, the engineered streambed module comprises a bottom layer in contact with the upstream and the downstream blocks and at least one intermediate block. In some cases, the intermediate block comprises at least one geomedia selected from iron filings, zero-valent iron, ash, green sands (waste from iron foundry industry), metal-oxide coated sands/sediments, pumice, organic-carbon based residuals (i.e. activated carbon, biochar, woodchips, peat moss, compost), inorganic-carbon based media (i.e. carbonates/limestones), zeolite, surfactant-modified zeolite, water/wastewater treatment residuals (i.e. waste alum), and combinations thereof. The intermediate block of the engineered streambed comprises a plurality of sub-blocks, for example an upper and lower sub-block, the lower sub-block having a hydraulic conductivity that is greater than the upper sub-block and or the hydraulic conductivity of the native stream.

Also disclosed is an engineered streambed system comprising: one or more streambed modules, wherein the streambed module comprises an upstream block of low hydraulic material; a downstream block of low hydraulic material; and at least one intermediate block positioned between the upstream bock and the downstream block, wherein the upstream blocks have a hydraulic conductivity less than the hydraulic conductivity of a native streambed, intended to receive the module, and the intermediate block comprising native streambed material and/or at least one material with a hydraulic conductivity that is similar to or greater than that of the native streambed. In some embodiments, the disclosed system comprises at least two modules, wherein at least two modules are positioned in parallel, and/or in series, wherein a first upstream module defines a downstream block that defines an upstream block of the second module and/or wherein a first upstream module is separated from a second module by a length of native streambed.

A method of enhancing water quality in a stream is also disclosed, the method comprising: placing a BEST module in a streambed; allowing water with one or more contaminants to enter the BEST module; and thereby enhancing the quality of the water in the stream upon exiting BEST, wherein the BEST module is placed in a natural streambed and/or a man-made streambed. In some cases, the streambed is an existing streambed, wherein the method includes removing at least part of the existing streambed to allow the BEST module to be placed in the streambed, while in other cases, the stream and the streambed are a constructed with the BEST module. The disclosed method may include wherein the streambed is a concrete channel.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

BRIEF DESCRIPTION OF THE DRAWINGS

FIG. 7A shows locations of coupons (C1-C4), high and low ports (1-6), BEST barriers (adjacent sample ports 2 and 5), and the arrow at top shows the flow direction. FIG. 7B is a close-up photo showing a sample coupon and sampling ports.

FIG. 11A shows absolute concentrations, whereas FIG. 11B shows effluent concentrations normalized to influent concentrations.

DETAILED DESCRIPTION

Figure 1A:
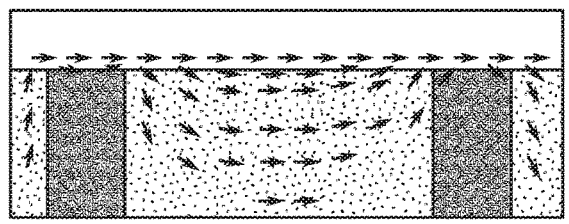
FIGS. 1A-1E depict various cross sections of stream and HZ showing BEST structure initial analysis. In each figure, water preferentially flows around low K blocks (black) and into high K blocks (dark gray).

Hyporheic exchange is a topic of growing interest for stream restoration and biogeochemistry because of the hyporheic zone's (HZ) potential role in improving water quality and mitigating temperature fluctuations. Often, flow through the HZ is small relative to stream flow and thus water quality enhancements are not significant over small distances. Despite recognized benefits of active HZs, few studies have considered hydraulic conductivity (K) modifications within the streambed to enhance hyporheic exchange and stream water quality.

Disclosed herein are structures, systems and methods for modifying streambeds to enhance exchange of surface water and hyporheic water, and improve the quality of water flowing through the stream. In most cases, the disclosed structures, systems, and methods enhance HZ exchange and improve water quality without obstructing surface streamflow or fish movement. In many cases, the disclosed structures and systems are protected from scouring and siltation by overlying native sediments. Thus, in many embodiments, the subsurface BEST modules are not visible. The disclosed systems combine blocks of low hydraulic conductivity material and high hydraulic conductivity media (which may include geomedia) to aid in the treatment of one or more streamwater contaminants. In many embodiments, the terms low or high hydraulic conductivity is in reference to the streambed into which the BEST module is placed. That is, if the BEST module has higher conductivity than the surrounding streambed, it is high conductivity, if it has lower conductivity than the surrounding streambed, it is low conductivity. In other embodiments, the terms high and low conductivity refer to measured conductivity, as discussed below.

Disclosed herein are engineered streambeds comprising one or more modules, comprising porous or non/porous material having a hydraulic conductivity that is different from the hydraulic conductivity of the native streambed. A native streambed is a streambed that is not engineered, i.e. not within a BEST module. For example, a streambed may be entirely engineered with one or more BEST modules positioned within the streambed, the native streambed is the streambed outside the BEST module. In many embodiments, the modules may be referred to as a BEST module. The BEST module may comprise an upstream block of low hydraulic conductivity material, a downstream block of low hydraulic conductivity material, and a block of moderate or high hydraulic conductivity material positioned between the upstream block and the downstream block. In many embodiments, the BEST module may further comprise a bottom layer. In most embodiments, the bottom layer is in contact with the upstream and downstream blocks and one of the intermediate blocks. The bottom layer may aid in preventing water below the module from entering the module. In most embodiments, the bottom layer is constructed of a substantially low hydraulic conductivity material or water impervious material, for example clay, concrete, or ethylene propylene diene monomer (EPDM) liner. In many embodiments, the BEST module may be constructed of one or more recycled, renewable, or recyclable materials.

Disclosed herein are methods and systems for improving water quality. In general, streambed hydraulic conductivity is modified to enhance hyporheic exchange (exchange of water between the stream/surface and the HZ). These modifications are combined with biogeochemistry modifications to the HZ to further improve water quality. In most embodiments, all or a part of the surface stream water is treated by passing the stream water through the BEST module. Stream water passes into the BEST module because of a block of high hydraulic conductivity media within the BEST module, and/or low hydraulic conductivity block(s) positioned at or near the upstream and/or downstream edges of the BEST module. Within the BEST module may be one or more porous geomedia materials, through which the water may pass. In most embodiments the geomedia is reactive geomedia. In most embodiments reactive geomedia may aid in the removal, inactivation, or metabolism of a stream water contaminant. After flowing through the geomedia, the treated water exits the BEST module to re-enter and/or mix with the surface water.

In most embodiments, two or more BEST modules may be positioned within a stream to aid in treating some or all of the stream water. In some embodiments, the modules are positioned in series with a first module positioned upstream of a second module, such that water passes over and/or through the first module toward the second module. When two or more modules are positioned in series a first and second module may be connected such that the downstream block of the upstream module may be the upstream block of the downstream module, or the modules may be separated such that a length of native streambed may be positioned between the modules. The two or more BEST modules may be positioned in parallel, such that the majority of water exiting one module does not enter the second module.

BEST may be used as part of a treatment train with stormwater detention ponds, for example in urban settings or agricultural settings. In some embodiments, ponds may capture flow from a design storm, settle suspended solids, and then slowly release at least partially clarified water at low flow rates into effluent streams. Detention ponds have been shown to remove some or a majority of TSS and sediment-bound contaminants. However, detention ponds, in some cases, may struggle to provide significant removal of coliforms that are typically required to meet stormwater standards. In some cases, these ponds can be a net source of nitrogen. That is, rather than attenuating nitrogen pollution, the ponds may, in some cases add to it. In many embodiments, the BEST module(s) may benefit from the flow regulation and pre-settling features of these ponds. In turn, BEST may provide additional water quality and habitat enhancements; especially nitrogen, coliform, and metals attenuation that ponds are not well suited for.

BEST may also be used in conjunction with wastewater treatment. In some embodiments, the BEST module(s) may act as a natural and/or final treatment step. For example, in some embodiments, secondary or tertiary effluent quality water could be conveyed to a receiving body of water using BEST modules (or streams) instead of pipes. In some cases, BEST modules may provide additional polishing of the water after other treatment processes have been completed. This extra water quality improvement may be eligible for some treatment or compliance credit.

In situ hydraulic conductivity may refer to the average hydraulic conductivity of the porous material in an unengineered streambed at or near the site of the BEST module. In some embodiments, in situ hydraulic conductivity may be measured upstream or downstream of the site of the BEST module. In most embodiments, in situ conductivity is less than high conductivity and more than low conductivity. In various embodiments, the conductivity of the in situ material may be referred to as medium or intermediate conductivity and may be between about $1 \times 10^{-2}$ and about $1 \times 10^{-5}$ cm/s. In situ hydraulic conductivity material may be engineered by mixing appropriate materials to achieve a similar hydraulic conductivity. In some cases, sand and or native streambed material may provide for hydraulic conductivity similar to in situ hydraulic conductivity.

Low hydraulic conductivity material may include, without limitation, rock, stone, plastic, EDPM, boulders and/or concrete. The low conductivity material may be, for example, recycled or pre-made concrete barriers. In most embodiments, low hydraulic conductivity material has a conductivity less than in situ conductivity. In many embodiments, the conductivity of low hydraulic conductivity material is less than about $1 \times 10^{-4}$ cm/s.

High hydraulic conductivity material may comprise various porous materials, for example gravel, cobbles, etc. High hydraulic conductivity material has a conductivity from about 5 to about $1 \times 10^{-2}$ cm/s. In many embodiments, high hydraulic conductivity material may comprise one or more geomedia, for example a reactive geomedia.

As discussed above, the upstream and downstream blocks may comprise low hydraulic conductivity material. These blocks aid in directing water out of the HZ toward the surface. In many cases, as depicted in FIGS. 1A-1E and 5A, these blocks may define a rectangular cross-section defining a depth extending from the surface of the streambed to a base of the block. In other embodiments, the cross-section area may define a square or triangle. In many embodiments, the upstream and downstream blocks define a top side that is positioned at or near the surface of the streambed, a bottom side surface at or near the base positioned away from the streambed surface, a front side surface positioned upstream, and a back side surface positioned downstream. In most embodiments, the base may be in contact with a bottom layer, and the back side surface of the upstream block may be in contact with an intermediate block, which is in contact with the front surface of the downstream block.

The intermediate block is positioned between the upstream and downstream blocks and above the bottom layer. In some embodiments the intermediate block may comprise one or more sub-blocks, for example an upper block positioned at or near the streambed surface, and a lower block positioned below the upper block. There may be more than two sub-blocks. In some cases, the sub-blocks may have the same or different hydraulic conductivity. For example, in FIG. 1E, the lower sub-block has a higher hydraulic conductivity than the upper sub-block. In most cases, the intermediate block and any sub-blocks may extend from the upstream block to the downstream block. In other embodiments, for example the embodiment depicted in FIG. 1B, the intermediate block or one or more sub-blocks may be interrupted by a block having a different hydraulic conductivity. In FIG. 1B, the upper and lower sub-blocks have the same or similar hydraulic conductivity, but the upper sub-block is further divided by a low conductivity block.

In some embodiments the intermediate block material may be a sand or sediment with a hydraulic conductivity that is the same or greater than the in situ or native material. In most cases, the hydraulic conductivity of the intermediate block may be greater than the hydraulic conductivity of the native, or in situ material. The hydraulic conductivity of the intermediate block is greater than the conductivity of the low hydraulic conductivity block.

The intermediate block material may be modified, for example to comprise a geomedia. In some embodiments, the material may be modified or mixed with other materials, for example minerals or organic carbon-based residuals that aid in reducing contaminants in the water. In some embodiments, the modification may require periodic regeneration, for example by adding additional minerals or organic carbon-based residuals into the intermediate block. In some embodiments, the modification may be a biofilm that may develop or grow on the intermediate block material or the geomedia.

Geomedia may be modified or unmodified, reactive or non-reactive. In some embodiments, without limitation, the geomedia may be natural or synthetic and may be selected from iron filings, zero-valent iron, ash, green sands (waste from iron foundry industry), metal-oxide coated sands/sediments, pumice, organic-carbon based residuals (i.e. activated carbon, biochar, woodchips, peat moss, compost), inorganic-carbon based media (i.e. carbonates/limestones), zeolite, surfactant-modified zeolite, water/wastewater treatment residuals (i.e. waste alum), and combinations thereof. Geomedia may be mixed with other materials to create an intermediate block, or the geomedia may be an intermediate block.

In most embodiments, the BEST module comprises a bottom layer. The bottom layer may be in contact with the upstream and downstream low conductivity blocks and at least one intermediate block. In many embodiments, the bottom layer may be impervious to water, and may be manufactured of natural and/or synthetic materials, for example bedrock, clay, concrete, fabric or liner. In some embodiments, the liner may be ethylene propylene diene monomer, EPDM.

The size and dimension of the BEST module may vary according to the geometry of the stream, flow rate of water in the stream, and contaminants in the stream water. In most cases, the width of the BEST module is similar to or greater than the width of the streambed, such that water within the BEST module flows over the downstream block (in the stream) rather than around the downstream block. In some embodiments, the width of the BEST module may be determined by placing one or more side blocks or panels in contact with the sides of the upstream and downstream blocks and extending at least the length of the BEST module. The length of the BEST module may vary, in most cases the length will be from about 2-10 meters, but may be more than 10 or less than 2 where appropriate in light of the flow rate, contaminants, and geometry of the stream. In most embodiments, the depth of the BEST module may be equal to the distance from the surface of the streambed to the base of one block, for example a low hydraulic conductivity block, or a bottom surface of the bottom layer.

Definition of Terms

Pollution or contaminant refers to biological or chemical constituents in water that degrade water quality, are toxic or harmful to biota (including humans), or are otherwise posing a risk to the environment or population. Such constituents include nutrients, pathogens, metals, organics, and synthetic chemicals that may be naturally occurring or introduced to the stream from stormwater, wastewater treatment effluent, industrial effluent, or nonpoint sources in urban or agricultural environments.

Streamwater can refer to any water, which may be carrying dissolved or suspended chemicals/materials, flowing in a natural or constructed (urban, rural, industrial) stream, river, or channel.

Streambed thus refers to the porous media below or adjacent to the stream that may exchange pore water with the stream.

A stream may refer to a water course that contains water. In some embodiments, a stream is a natural and/or man-made (engineered) water course. In many embodiments, a stream may include water periodically or episodically, for example after a storm, flood, or regular or non-regular discharge of water from a water source (sprinklers, irrigation system, pool, etc.).

Hydraulic conductivity structures, or blocks, refer to materials with hydraulic conductivity properties that can be combined and placed in the streambed to cause downwelling or upwelling of water into the streambed or from the streambed, respectively.

Reactive porous media or geomedia can refer to natural sediments (i.e. sand, gravel), chemically-enhanced sediments (i.e. iron-oxide coated sand, surfactant modified zeolite), or other natural or artificial media designed for the adsorption, absorption, breakdown, inactivation, precipitation, retardation, or otherwise removal of pollutants, or provenance or stimulation of biota residing in the porous media which do the same.

The disclosed, coordinated K modifications are termed Biohydrochemical Enhancement structures for Streamwater Treatment (BEST). Also disclosed are studies using MODFLOW and MODPATH (particle tracking) models to show the benefits of engineered BEST modules. In one embodiment, the disclosed model consists of a homogeneous, isotropic coarse sand HZ with high K (i.e. gravel) and low K (i.e. single boulders, cement) components placed below the sediment-water interface to increase exchange. Disclosed studies varied the bed slope and in situ sediment K to explore their impact on BEST performance. Based on hyporheic flux and residence time outputs from the model and reported metal, nutrient, and fecal indicator bacteria removal rate constants from literature for specific porous media, the contaminant mitigation potential of BEST structures was estimated. The disclosed studies demonstrated that downwelling fluxes into the HZ may be increased approximately linearly with increases in slope and in situ K according to Darcy's Law, whereas the residence time decreased approximately linearly. These studies indicate that there is a tradeoff within BEST of how much water is exposed to treatment in the HZ and the contact time of that water with microbes and reactive media. Despite differences of orders of magnitude in flux and residence time across a range of natural BEST in situ K and slopes, contaminant removal potential was relatively consistent in cases with incomplete contaminant removal. However, these studies also indicated that BEST models with long residence times that completely attenuate highly-reactive or low-level contaminants early in the flowpath may be less efficient than BEST with short residence times and more rapid turnover. Specific estimates of contaminant removal potential are highly sensitive to reported rate constants, which in some cases span orders of magnitude. Precise estimates of rate constants and site-specific considerations will be required to optimize BEST modules to cause water quality enhancement in actual streams.

Given that the Darcy flux scales linearly with K, which spans orders of magnitude in streambed sediments, this was identified as a potential target for enhancing hyporheic flow. Subsurface K modifications are not visible at the surface, do not obstruct streamflow or fish movement, and can be protected from scouring and siltation by overlying native sediments. Of course biogeochemical reactions are complicated and will not proceed during induced hyporheic flow without the appropriate conditions. Denitrification, for example, relies on adequate concentrations of denitrifying bacteria, electron donors, and nitrate. Elevated dissolved oxygen concentrations and extreme temperatures or pH can also inhibit the reaction. Despite this complexity, there is a growing body of literature suggesting that oxygen attenuation, nitrification, and denitrification be can be adequately approximated as a function of residence time in the HZ. For example, studies have estimated the first order rate constant for oxygen depletion at 0.0083 hr-1. However, others have shown that oxygen rapidly decreased from 7 to 2 mg L-1 within one hour in column experiments including woodchips, suggesting that elevated DOC can also enhance aerobic respiration. Simplified estimates of denitrification potential may utilize studies showing that net denitrification typically begins after 2.3 hours of hyporheic RT. Thus, increased hyporheic flow may be optimized with hyporheic residence times in order for water quality improvements to occur.

Although naturally occurring streambed sediments and microbes have potential to attenuate a variety of urban water contaminants given adequate hyporheic exchange, estimates of removal rate constants are rarely reported in the literature. This knowledge gap is due to the technical complexity of producing representative estimates of in situ removal of contaminants, including nitrate and organic micropollutants. Stream nutrient cycling experiments have historically been conducted at the reach scale, which lumps disparate stream compartments (i.e. thalweg, eddies, hyporheic zone) together rather than considering the properties and processes of each zone individually. However, recent efforts have been made to determine denitrification rates within hyporheic sediments by direct measurement. Nitrogen cycling has been studied in first and second order reaches of a Midwestern agricultural stream and determined first order denitrification rate constants of 3-0.003 mg N L-1 hr-1. Some investigators have noted differences between denitrification rates in sediments underlying the stream thalweg versus more stagnant side-channels and suggested denitrifier density and dissolved organic carbon (DOC) concentrations as controlling factors. Analyzing data from a pristine stream, a first order denitrification rate constant of 0.038 mg N L-1 hr-1 has been determined, within the range of other studies.

In some embodiments, contaminant removal may be further enhanced by the incorporation of reactive porous media into hyporheic sediments. Since denitrification depends in part on quantity and type of DOC, adding organic carbon sources to hyporheic sediments might be able to enhance the reaction. In column and field bio-reactor experiments with woodchips providing excess DOC, denitrification was found to be zero order for nitrate concentrations above 1 mg L-1. Fresh woodchip reactors achieved denitrification rates of up to 0.97 mg N L-1 hr-1, which declined over time before leveling off at 0.38 mg N L-1 hr-1 after seven years. Other investigators also implemented flow-through phosphate reactors in agricultural drainages using industrial byproducts such as fly-ash for geomedia. In such studies, subsurface flow was driven by in-channel obstructions cobble berms and dams, not through use of the presently disclosed BEST modules, which have not been used before except by the present applicants. Other notable geomedia are green sands, manganese oxide coated sands, and zero valent iron (ZVI) for metal immobilization, and biochar and sulfur/limestone for nutrient removal. Earlier reported rate constants for contaminant removal may facilitate estimates for potential attenuation within the HZ.

EXAMPLES

Example 1—Basic Model

Disclosed herein are HZ models constructed using MODFLOW and MODPATH for particle tracking. The streambed was modeled as a simplified, idealized system with dimensions matching a constructed stream facility at the Colorado School of Mines intended to mimic an urban stormwater channel. In the disclosed models, homogeneous, isotropic sediments had a uniform 1 m depth to an impermeable boundary. Slopes were applied using a constant head boundary at the top of the model that decreased along the length of the stream, and the stream was approximated as a layer with a K of 0.33 m/s, porosity of 1, and constant depth of 0.152 m. Boundary conditions produced slight perturbations throughout the model, but these declined rapidly with distance from the boundaries. Therefore all structures were evaluated at the center of a 1000 m model.

The disclosed BEST-induced fluxes were several orders of magnitude larger than the boundary perturbations. Subsurface K modifications were the only cause for hyporheic flux considered in the model. Therefore a simulated streambed with no BEST structure experiences no hyporheic exchange besides perturbations from the boundary conditions and numerical error. While this is clearly a simplification, it is a reasonable approach to isolate the effect of BEST structures on enhancing water flow through the streambed. Similar assumptions have been used to model the effects of bedforms on hyporheic flow. Using MODPATH, 100 particles spanning the downwelling zone of each structure were released at the sediment-water interface and tracked until they returned to the stream.

In MODFLOW, cell-by-cell flows are calculated using Darcy's Law. As shown below with Equation (1), where Q is the volumetric flux, K is the hydraulic conductivity, A is the cross-sectional area, and $\Delta h/\Delta l$ is the head gradient, all in the direction of flow. Thus for a given surface area, downwelling and upwelling depend on the sediment K and the hydraulic-head gradient.

$$Q = KA\frac{\Delta h}{dl} \qquad \text{Equation (1)}$$

MODPATH water velocities are calculated using Equation (2), below, where v is flow velocity, and n is media porosity. Residence times are therefore inversely correlated with total flux and hydraulic conductivity and directly correlated with sediment porosity.

$$v = \frac{Q}{n*A} \quad \text{Equation (2)}$$

Enhanced Flow Through BEST Structures

Previous studies have evaluated single rectangular and triangular subsurface streambed K structures for their impact on hyporheic flow and residence time. The K and dimensions of the structures were varied in a sensitivity analysis because these would be design parameters in a field implementation. Other parameters such as slope and in situ (background) sediment K were held constant, because these would be fixed, and presumably measured, in a stream restoration application.

In the disclosed structures, variables such as slope and in situ sediment K may impact the flow through the BEST structure. Thus, these variables may be manipulated in constructing various embodiments, for example constructed urban streams. Thus, more complex, modular structures were modeled and specifically tailored to maximize hyporheic exchange. These embodiments were then explored for sensitivity to variations in in situ sand K and bed slope. Initial analysis was performed on five modular structures. These structures, depicted at FIGS. 1A-1E, were analyzed for induced downwelling flux (per meter of channel width), mean residence time along hyporheic flowpaths, modular length, and whether the structure created efficient hyporheic exchange.

In FIGS. 1A-1E, flow is from left (upstream) to right (downstream). The top (blue) zones represent the surface stream, whereas the lower zones (tan, gray, black) are the porous media comprising the streambed. Tan zones represent a zone of intermediate hydraulic conductivity (K), such as native, in-situ sediments (i.e. sand). Black zones represent media of relatively low K (i.e. concrete blocks, boulders). Gray zones represent media of relatively high K, such as gravel or well-sorted sand. Low K zones divert flow around them, while high K zones cause flow to converge into them. The combination of such zones into the streambed structures can be complex or simple, but in each case causes hyporheic exchange.

Reactive geomedia can be incorporated at any point within the structures. In most embodiments, the reactive geomedia may have their hydraulic properties altered (i.e. crushed, sieved) to match the desired/designed hydraulic conductivity and porosity of the zone.

Other geometries were also explored but are not presented in FIG. 1. In most embodiments, efficient exchange is defined as complete return of hyporheic water to the stream after passing through the BEST.

Triangular low K blocks, with the base of the triangle positioned at the base of the stream, may minimize deadspace within BEST structures. However, triangular low K blocks were not constructed in the present MODFLOW analysis. Rather, low K blocks are shown as 0.5 m long rectangles to reserve space for the triangular base. In various embodiments, the width of the low-K block showed little impact on hyporheic fluxes relative to the penetration depth (not shown). For the initial analysis the respective K and porosities of the sediments were 0.01 ms$^{-1}$ and 0.44 for high K blocks (gravel), 0.00575 ms$^{-1}$ and 0.39 for the sand, and 10$^{-12}$ ms$^{-1}$ and 0.01 for the low K blocks (boulders, concrete).

After the initial analysis, further simulations were performed on the optimal BEST to examine sensitivity of both downwelling flux and particle residence time to in situ K and model slope. Stream velocity is not considered because BEST effectiveness showed minimal sensitivity to this parameter, probably because the subsurface structure does not directly contact the stream in the way that bedforms or in-channel obstructions do. In situ K was varied from 5.8·10$^{-5}$ (K1) to 5.8·10$^{-3}$ ms$^{-1}$ (K3) with respective porosities of 0.29 and 0.39. The end members were based on actual sands (Concrete sand, Rio Grande Sand and Gravel, Denver, Colo. and #16 Accusand, AGSCO, Wheeling, Ill., respectively); a theoretical intermediate was also tested with K of 5.8·10$^{-4}$ and porosity of 0.34 (K2). Slope was varied from 0.01 to 2%. This range is much lower than the 5% grade used previously for a mountain headwater stream, but is reasonable for urban streams.

Contaminant Attenuation Rates

All contaminant removal rate constants and references considered in the disclosed study are shown in Table 1. Among metals, nutrients, and pathogens considered in this study, nitrate is unique in having directly-measured removal rate constants reported for natural sediments and geomedia. While we recognize that denitrification is controlled by complex biogeochemical interactions, its correlation to hyporheic residence time has allowed residence time to inform estimates of denitrification. In this study, model hyporheic residence times are used to estimate nitrate removal for: 1) denitrification observed previously in natural sediments with low-moderate DOC and 2) denitrification measured previously in water with excess woodchip-derived DOC.

Contaminant degradation along each flowpath follows standard first-order decay for plug flow reactor conditions according to $$C = C_0 e^{-kt} \quad \text{EQ (3)}$$

Where C is the resulting concentration, $C_0$ is the initial concentration, k is the reaction rate constant, and t is the RT. However, because flowpaths in BEST present a distribution of RT rather than plug flow, the reactions along individual flowpaths were averaged. The change in reach-scale contaminant concentrations was approximated by averaging and then flux-weighting HZ contaminant removal by the ratio of BEST discharge to stream discharge according to $$R = \frac{\sum_{i=1}^{n}(1-e^{-kt_i})}{n} \times \frac{Q_{BEST}}{Q_{Stream}} \times 100 \quad \text{EQ (4)}$$

where R is the percent contaminant removal from the stream per BEST module, $t_i$ is the RT of the ith hyporheic flowpath within BEST, n is the number of flowpaths, $Q_{BEST}$ is the downwelling flow into a single BEST module, $Q_{stream}$ is the stream discharge, and 100 is a multiplication factor to convert to percent removal.

TABLE 1

Removal rate constants for selected nutrients, metals, and pathogens. All reactions are pseudo-first order.

| | Geomedia | k (hr$^{-1}$) * (mg N L$^{-1}$ hr$^{-1}$) | Reference |
|---|---|---|---|
| NO$_3^-$ | Native sediments | 0.038 | Gomez et al. 2012 |
| NO$_3^-$ | Woodchips | 0.63 | Robertson 2010 |
| PO$_4^{3-}$ | Biochar (sugar beet tailings) | 0.155 | Yao et al. 2011 |
| Zn (II) | Green Sands | 0.040 | Lee et al. 2004 |
| Zn (II) | ZVI | 0.070 | Wilkin & McNeil 2003 |
| Cu (II) | Mn-oxide sands | 0.019 | Han et al. 2006 |
| Cu (II) | ZVI | 0.270 | Wilkin & McNeil 2003 |
| Pb (II) | Mn-oxide sands | 0.018 | Han et al. 2006 |
| Ni (II) | ZVI | 0.606 | Moraci and Calabrò 2010 |
| Ni (II) | ZVI/pumice mixture | 0.197 | Moraci and Calabrò 2010 |
| Ni (II) | ZVI | 0.080 | Wilkin & McNeil 2003 |
| Al (III) | ZVI (peerless) | 0.350 | Wilkin & McNeil 2003 |
| As (V) | ZVI | 0.250 | Wilkin & McNeil 2003 |
| Cd (II) | ZVI | 0.120 | Wilkin & McNeil 2003 |
| Hg (II) | ZVI | 0.250 | Wilkin & McNeil 2003 |
| E. coli | Iron-oxide coated sand | 4.240 | Zhang et al. 2010 |

Denitrification may be inhibited by the presence of dissolved oxygen, but recent studies indicate that local anoxic niches may facilitate denitrification even in oxic, net-nitrifying regions of the hyporheic zone. To predict the onset of complete anoxia the first order rate constant for oxygen depletion was estimated at 0.0083 hr$^{-1}$. However, oxygen rapidly decreased from 7 to 2 mg L$^{-1}$ within one hour in the woodchip column experiments, suggesting that elevated DOC can also enhance aerobic respiration. Simplified estimates of denitrification potential utilize previous findings that determined that net denitrification typically begins after 2.3 hours of hyporheic residence time. Thus 2.3 hours were subtracted from the mean residence time (MRT) of each BEST model simulation run to yield a mean denitrification-reaction time (MDT). Exponential decay rates were applied to the MDT to yield percent nitrate removal (first order) and mass of nitrate removed per time (zero order).

For metals, phosphorus, and E. coli, removal rate constants are only reported for geomedia. Since the attenuation of these contaminants is not necessarily influenced by oxygen concentrations, MRT rather than MDT were used to estimate removal potentials.

Results

Figure 1B:
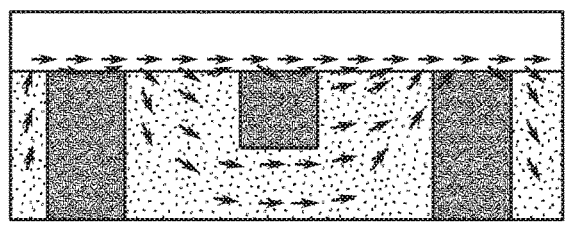
Figure 1C:
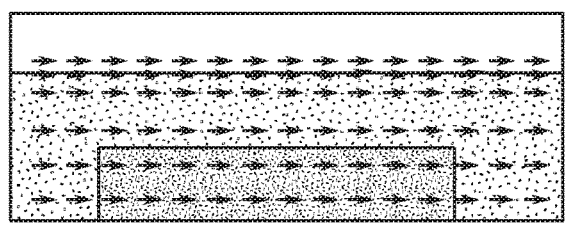
Figure 1D:
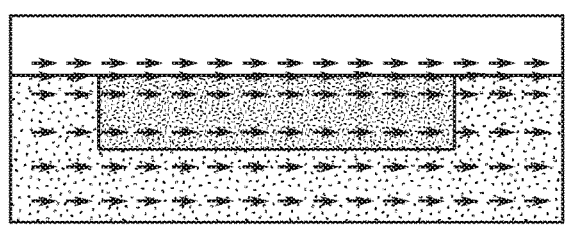
Figure 1E:
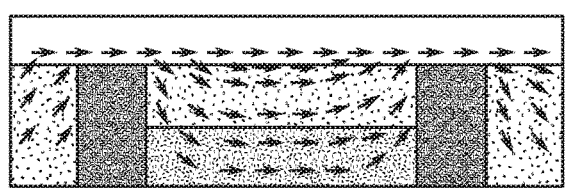

All simulated BEST structures induced hyporheic flux, but the downwelling fluxes were substantially higher in structures shown in FIGS. 1A and 1E with low K bookends. In addition to the hyporheic flux induced within the BEST, structures A, B, and E create upwelling upstream of the low K structure and downwelling downstream of the low K structure. This causes efficient exchange but was not included in the downwelling flux because our objective is to quantify effectiveness of a single BEST module. This additional exchange would be associated with an adjacent structure in a series of BEST applications. Structure C had the longest mean residence time but the least downwelling, and neither high K box (as shown in FIGS. 1C and 1D) created efficient exchange. Structure E, hereafter referred to simply as BEST, was determined to achieve the optimal balance of hyporheic residence times, efficient exchange fluxes, and structure footprint.

TABLE 2

BEST initial analysis.

| Structure | Downwelling per meter channel width (L/s) | Mean residence time (hr) | Modular length (m) | Efficient exchange |
|---|---|---|---|---|
| A | 0.149 | 3.69 | 3 | Yes |
| B | 0.095 | 4.10 | 3 | Yes |
| C | 0.051 | 5.30 | 5.5 | No |
| D | 0.071 | 3.77 | 5.5 | No |
| E | 0.167 | 3.70 | 3 | Yes |

Downwelling Flux

Figure 2:
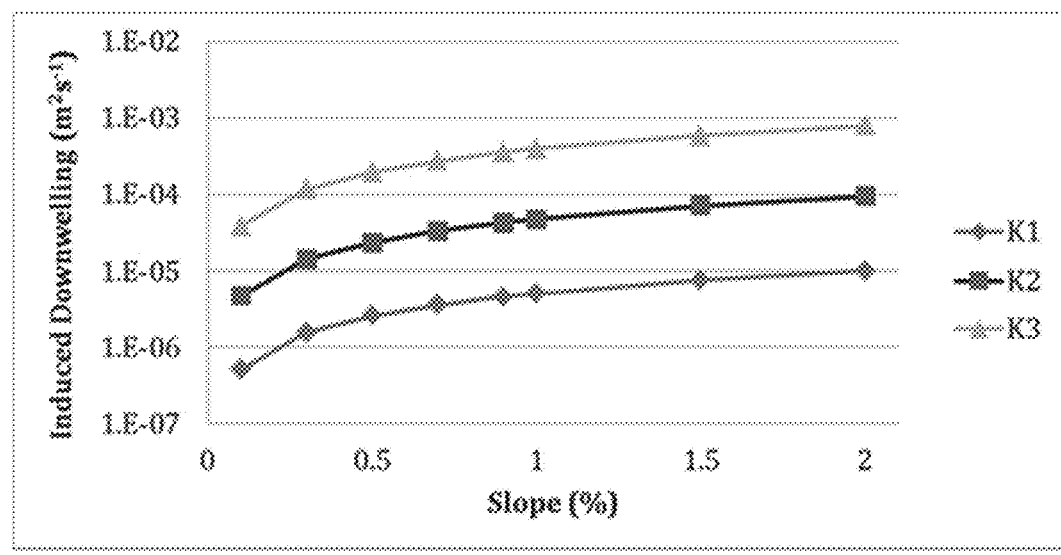
FIG. 2 depicts the sensitivity of induced hyporheic flux to sand K (top) and energy slope (bottom). Flux varies linearly with both parameters according to Darcy's law.

Induced hyporheic flux shows a linear relationship to both in situ sand K (Table 2, FIG. 2) and channel slope (FIG. 2), as expected according to Darcy's Law. Fluxes per meter width for a single BEST module ranged from effectively zero (5.10$^{-4}$ Ls$^{-1}$) at a slope of 0.1% and in situ K of 5.78·10$^{-5}$, to 0.789 Ls$^{-1}$ at a 2% slope and sand K of 5.75·10$^{-3}$. A 1% slope matching the constructed stream at Colorado School of Mines produced downwelling of 0.39 Ls$^{-1}$ at K=5.75·10$^{-3}$ ms$^{-1}$.

TABLE 3

Induced hyporheic flux, per meter of channel width, for different combinations of in situ sand K and number of BEST modules in series at 1% slope. Fluxes are reported as both gpd and Ls$^{-1}$ for ease of interpretation.

| | | # of Modular Units | | |
|---|---|---|---|---|
| | | 1 | 10 | 40 |
| Induced Flux (gpd) | K1 = 5.8E-5 (m/s) | 115 | 660 | 2,380 |
| | K2 = 5.8E-4 (m/s) | 1,080 | 6,075 | 22,720 |
| | K3 = 5.8E-3 (m/s) | 8,980 | 43,060 | 157,180 |
| Induced Flux (Ls$^{-1}$) | K1 = 5.8E-5 (m/s) | 0.005 | 0.03 | 0.11 |
| | K2 = 5.8E-4 (m/s) | 0.047 | 0.27 | 0.99 |
| | K3 = 5.8E-3 (m/s) | 0.390 | 1.89 | 6.89 |
| Total BEST Series Length (m) | | 3 | 25.5 | 100.5 |

Residence Times

Figure 3:
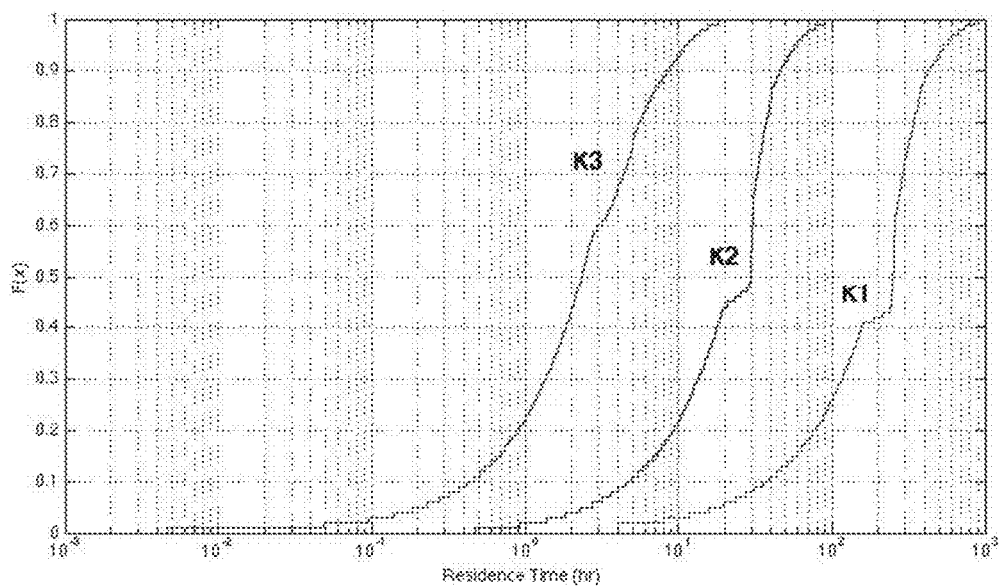
FIG. 3 depicts the cumulative frequency diagrams of particle residence times within BEST for three different K values 1% slope, n=100.

Cumulative frequency diagrams of MODPATH simulations (FIG. 3) show particle mean residence time decreased with increasing sand K, as these higher K values augmented downwelling fluxes by 1-2 orders of magnitude more than the corresponding decreases in porosity. Additionally, particle flowpaths are influenced by the ratio of in situ sand K to that of BEST structures so path length varies slightly with changes in K. Specifically, at larger in situ K values, the BEST has less impact and hyporheic flowpaths are shorter in distance and shallower.

Figure 4:
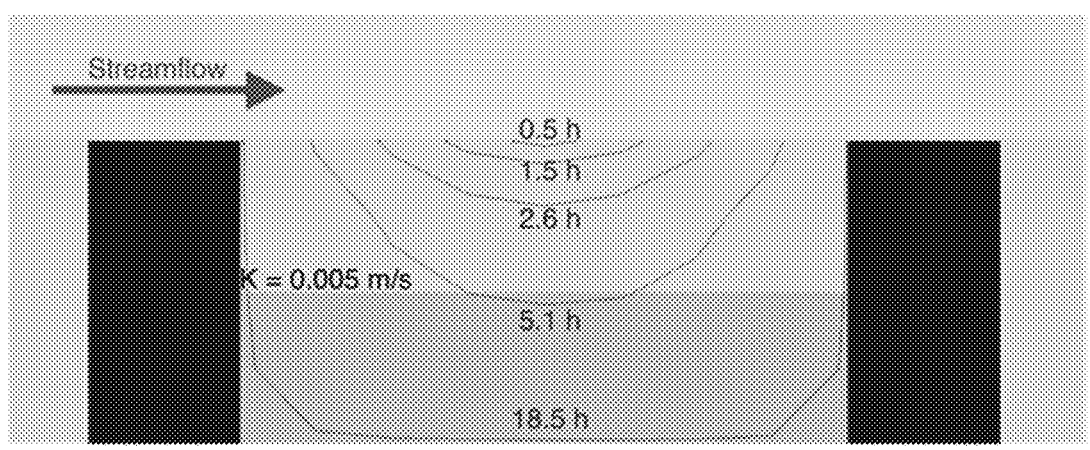
FIG. 4 depicts select, representative flowpaths and residence times within BEST at 1% slope and K=5.75·10$^{-3}$ ms$^{-1}$.
Figure 5:
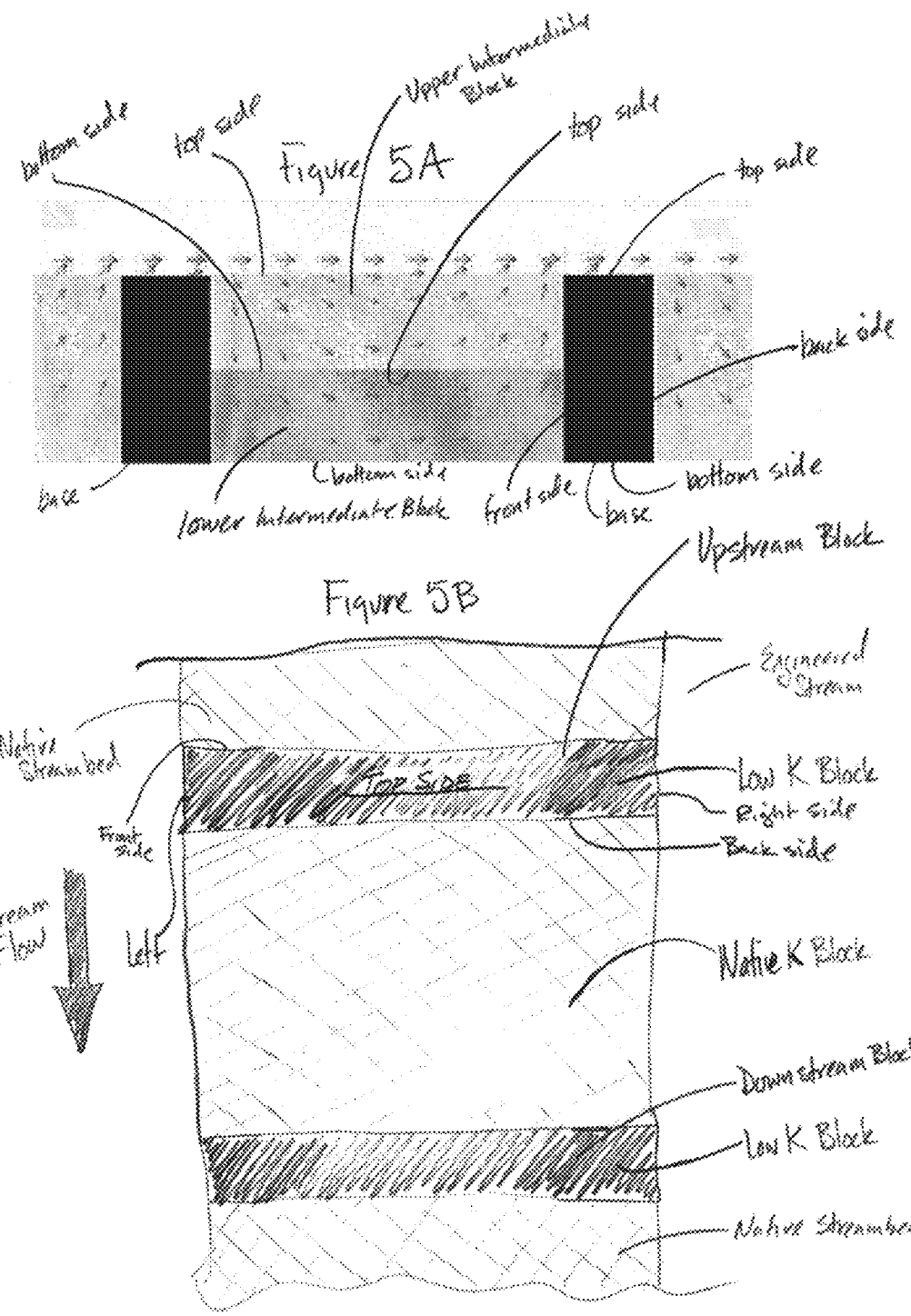
FIGS. 5A and 5B depict an engineered stream having a BEST module depicted from the side (cross section), 5A, and from above, 5B.

Long observed mean residence time was observed for the combination of the small in situ K and low slope, whereas the converse was true of short mean residence time. At 1% slope and K=5.75·10$^{-3}$ ms$^{-1}$, the mean residence time was approximately 3.6 hours (FIG. 4). The maximum observed mean RT (3,766 hr) was observed for the combination of the smallest in situ K and minimum slope, whereas the converse was true of shortest mean RT, (1.56 hours). At 1% slope and K=5.8·10$^{-3}$ ms$^{-1}$, the mean RT was approximately 3.27 hours, while RTs of the majority of specific flowpaths varied between about 0.5 hours and 19 hours.

Denitrification Potential

MRT and MDT are reported in Table 4 for each in situ K scenario at 1% slope. The percentage of nitrate removed from downwelling water during its time in the BEST is also shown for 1) the minimum 1st-order denitrification rate constant reported previously, and 2) the maximum rate constant. These rate constants differ by three orders of magnitude and exert substantial influence on the potential effectiveness of BEST. For example, in these experiments the in situ K3 BEST has potential to remove only 0.4% of nitrate that enters the structure assuming the minimum rate constant, but this increases to 98% assuming the maximum. Thus BEST efficiency depends on the denitrification rate constant. The effectiveness of BEST under different in situ K scenarios is also determined by the denitrification rate constant. Assuming the maximum rate constant, all BEST with K1-K3 may achieve approximately 100% removal of influent nitrate. However, these experiments suggest that the K3 BEST induces an order of magnitude more flux than the K2 BEST, so its net effect on stream concentrations is also one order of magnitude larger. This effect is most clearly demonstrated by flux-weighting the potential denitrification, which is achieved by simply multiplying each calculated BEST percent nitrate removal by its corresponding downwelling flux. Despite orders of magnitude differences in MRT and flux between K1-K3, the flux-weighted nitrate removals are all within a factor of 2.5 for the minimum rate constant case. These values are 0.0025, 0.0035, and 0.0015 mg N $s^{-1}$ for K1-K3, respectively. Conversely, for the maximum rate constant the respective flux-weighted removals were 0.005, 0.047, and 0.382 for K1-K3. This decreased efficiency for K1 and K2 relative to K3 is caused by the early completion of denitrification along the longer residence time flow paths. Clearly the rate constant for denitrification, or any reaction of interest, is a parameter that needs to be determined to optimize each BEST design. Other factors such as residence time and length may be more easily engineered using reactive porous media with appropriate hydraulic conductivity and geometries.

TABLE 4

BEST mean residence time (MRT), mean denitrification time (MDT), and percent nitrate removal for end-member 1st-order denitrification rate constants reported by Harvey et al. (2013).

| | | K1 5.8E−5 (m/s) | K2 5.8E−4 (m/s) | K3 5.8E−3 (m/s) |
|---|---|---|---|---|
| | Mean Residence Time (hr) | 232 | 28 | 3.6 |
| | Mean Denitrification Time (hr) | 229.7 | 25.7 | 1.3 |
| Percent $NO_3$ Removal | 1st order $k = 0.003\ hr^{-1}$ | 49.8 | 7.4 | 0.4 |
| | 1st order $k = 3\ hr^{-1}$ | 100 | 100 | 98 |

Geomedia effective at nitrogen removal may be used with the disclosed modules.

Discussion

The modeling results demonstrate that increasing either sediment K or channel slope can effectively increase hyporheic exchange throughout the BEST module. In practice BEST media properties may be easier to select, especially in constructed urban channels (i.e., for stormwater or recycled water conveyance) or as part of river restoration efforts (i.e., for daylighting urban streams). Conversely, increasing these same factors decreases mean particle residence time in the subsurface. Larger downwelling fluxes expose greater fractions of streamwater to treatment within the hyporheic zone, but residence times that are short relative to contaminant reaction rates may lessen treatment.

Enhancing streamwater quality by improving hyporheic exchange may benefit from optimization of hyporheic flux with residence time distribution and contaminant removal rate. That is, the hyporheic residence times may be selected to match with biogeochemical processes regulating contaminants of concern such that water remains in the hyporheic zone long enough to remove pollutants, and enabling a sufficient volume of water to be treated to meet design goals. If residence times greatly exceed pollution reaction rates then water parcels are spending unnecessary time within the hyporheic zone at the expense of greater downwelling fluxes.

Numerical simulations enabled a BEST design that induced large hyporheic fluxes and moderate residence times relative to other structure options while also achieving efficient exchange. Further modeling that varied K and channel slope produced a range of hyporheic fluxes and residence times. K modifications, such as the disclosed BEST structures, produce greater relative effect in smaller streams. The disclosed BEST produces a downwelling flux of nearly 7 $Ls^{-1}$ per meter width along a 100 m reach with 1% slope, which is relevant to many small urban drainages. Downwelling on the order of 7 $Ls^{-1}$ could accommodate flow-controlled releases from storm-water detention ponds, seasonally dry channels that contain dry-weather flow, or a substantial fraction of other small urban streams. While a limited number of embodiments were shown with a limited set of modified variables, other embodiments, with additional modified variables, are envisioned.

$Q_{BEST}$ and RT are highly sensitive to sediment K and channel slope, as well as BEST design and dimensions. In practice, slope can be difficult to modify, whereas BEST media properties may be easier to select, especially in constructed urban channels (e.g., for stormwater or recycled water conveyance) or as part of river restoration efforts (e.g., for daylighting urban streams). Lower values of K for BEST sediments provide long RTs but diminished downwelling and may be less effective for stream water quality enhancements due to transport limitation. Conversely, increasing K causes decreased mean RTs in the subsurface and yields larger downwelling flows. High K BEST thereby expose greater fractions of streamwater to treatment within the HZ and typically have greater potential for reach-scale improvements in contaminant levels, even when $Da_{HZ}$ drops below 1. These results differ from conventional wisdom that $Da_{HZ}>1$ (e.g., Harvey et al. 2013) or $Da_{HZ}>>1$ (e.g., Grant et al. 2014) are ideal. These differences can likely be attributed to varying scales (reach vs. hyporheic flowpath), and controlling factors for hyporheic exchange (BEST vs. bedforms) and flowpath residence time (seepage velocity vs. flowpath length).

Although the results suggest that shorter RT may be preferred, high K BEST RTs may be too short to deplete dissolved oxygen, as required by anaerobic reactions such as denitrification. Results suggest that further increasing K and slope would improve removal for aerobic reactions, but there is an upper limit to the K of BEST sediments and to the slopes at which bed sediments are stable. High K end members may not have adequate contact times or equal reaction rate constants compared to lower K sediments as assumed in the model. Thus, hydraulic considerations and contaminant reaction efficiency of BEST geomedia are equally important. Enhancing streamwater quality by improving hyporheic exchange requires the optimization of hyporheic flow with RT distribution and reaction rates specific to a given sediment and particular contaminant(s). That is, the hyporheic RTs should match with biogeochemical processes relevant to the contaminants of concern such that water remains in the HZ only long enough to remove contaminants, and enabling a sufficient volume of water to be treated to meet design goals. If RTs greatly exceed reaction rates then water parcels are spending unnecessary time within the HZ at the expense of greater exchange flows.

The residence times and downwelling of BEST, which necessarily shift in opposite directions, remained approximately in balance over a range of in situ K and channel slope values. This resulted in first order removal within a factor of 2.5 for all in situ K scenarios. Quantified estimates of nitrate mass removal via denitrification depend on the first order rate constants and initial concentrations in streamwater. However, the nitrate removal may be higher with the incorporation of woodchips into the BEST, which provides dissolved organic carbon. Thus woodchip incorporation may generally enhance denitrification within BEST relative to native in situ sediments alone. The effect of woodchips would be greatest in streams with small natural first order denitrification rate constants.

BEST structures may be useful for processing pollutants other than nitrate, particularly when combined with additional reactive geomedia. These media could be mixed into the BEST sediments to facilitate additional reactions. In some embodiments, the lifespan of such media may be another factor to consider. In some embodiments, media, such as woodchips, that may lower dissolved oxygen concentrations within the stream, may be paired with reaeration steps or carefully spaced to regulate oxygen levels.

As observed in previous studies, siltation can reduce the K around river restoration structures, diminishing hyporheic exchange. Thus BEST structures may be less efficient in streams with high silt loads. In other embodiments, BEST structures may be modified for use in high silt streams. BEST in streams with low silt loads may be maintained by occasional scraping or by natural scouring during precipitation events. Sites with moderate scouring may require shorter, bottom-based BEST structures, whereas intense scouring may preclude the installation of BEST structures entirely.

Based on modeling results, BEST structures show great promise for attenuating nitrate pollution. BEST modules may also be designed using geomedia capable of attenuating other contaminants in urban or agricultural runoff (e.g., metals, pathogens, organic contaminants). Thus BEST modules could play an important role for water quality in manifold settings.

Solute exchange between streamwater and HZ provide pollutant attenuation and biogeochemical cycling. Thus, streams are not pipes; and they do more than simply convey water downstream. However, HZ in urban streams are not currently managed to provide water quality benefits. For example, lining channels with concrete for rapid transmission and flood control effectively destroys the HZ. In contrast, daylighting (the conversion of buried pipes or culverts to urban streams) can contribute to urban greenspace, which can improve recreation opportunities, aesthetics, property values, human health metrics, and social justice. Urban streams in place of pipes could route stormwater and recycled water to irrigation or infiltration sites, all while utilizing a robust HZ to improve water quality.

Example 2—Tank Experiments

Background

Figure 6:
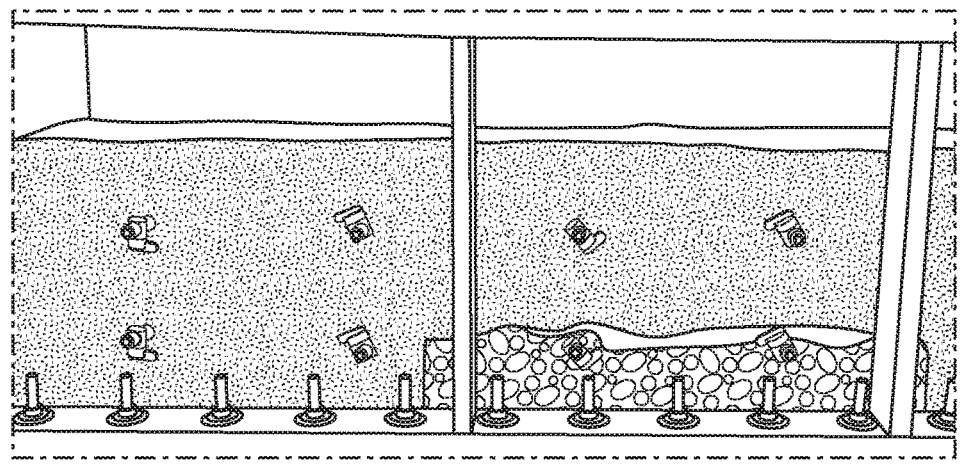
FIG. 6 is a photograph of one embodiment of the disclosed systems showing dye study to identify flowpaths.

A study was conducted to test water quality improvements taking place along hyporheic flowpaths within the presently disclosed devices. Benchtop-scale tanks were used to investigate nitrate removal capabilities of the presently disclosed system by monitoring water quality and sediment microbiology within the benchtop-scale tanks. In addition, the disclosed system included a mixture of sand and woodchips. FIG. 6 is a photo of one embodiment of a BEST model of results from dye studies showing BEST flowpaths.

Methods and Materials

Figure 7A:
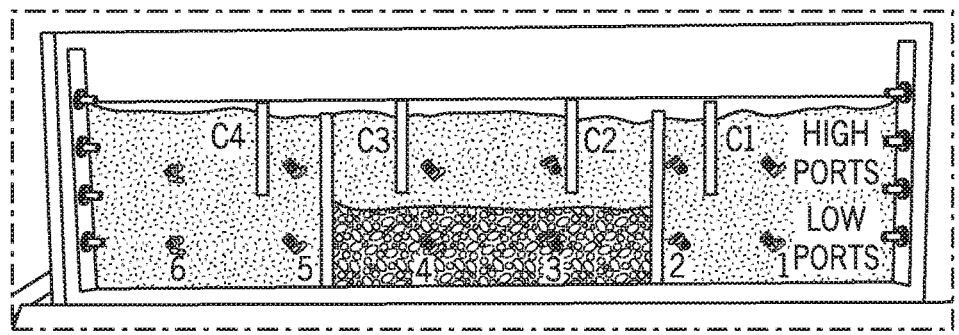
FIGS. 7A and 7B show tank experiment set up.
Figure 7B:
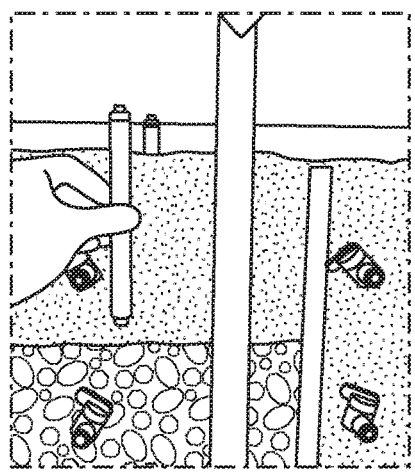

An acrylic tank was made and fitted with sampling ports (FIGS. 7A and 7B). The tank was 4 ft. long, 5" wide, and approximately 2 ft. deep. The tank was placed at a 1% slope from upstream to downstream, and water was pumped in at approximately 0.5 gpm. The water drained freely from the downstream end at a set rate to prevent ponding. The BEST module was approximately 1.5 ft. long and consisted of thin plastic sheeting for the low K blocks, and a 3" deep layer of gravel for the high K bottom block. Accusand #16 was used for the in situ sand, and red cedar woodchips were mixed in with the sand in the BEST module (but not the sand outside of the module). The gravel was separated from the overlying sand/woodchip mixture by a layer of mesh screen.

Nitrogen analysis was performed by spectrophotometry using Hach TNT kits for nitrate, nitrite, total nitrogen, and ammonia. Microbial gene analysis was performed using next-generation phylogenetic analysis (Illumina MiSeq) coupled to qPCR of 16s genes and functional genes involved in denitrification (i.e. nirS and nirK). Both N and microbial DNA analyses follow standard procedures at the School of Mines.

Influent water consisted of reclaimed wastewater from the Mines Park facility (Colorado School of Mines). Influent nitrate concentrations fluctuated around 6-10 mg/L.

Sampling

Water samples were collected from ports built into the tank walls. Sediment samples for DNA analysis were taken using soil "coupons" and sachets at different hyporheic depths. FIG. 6 is a photograph of one embodiment of the disclosed systems showing dye study to identify flowpaths. FIGS. 7A and 7B show tank experiment set up for the present experiments. FIG. 7A shows locations of coupons (C1-C4), high and low ports (1-6), BEST barriers (adjacent sample ports 2 and 5), and the arrow at top shows the flow direction, and FIG. 7B is a close-up photo showing a sample coupon and sampling ports.

Figure 8A:
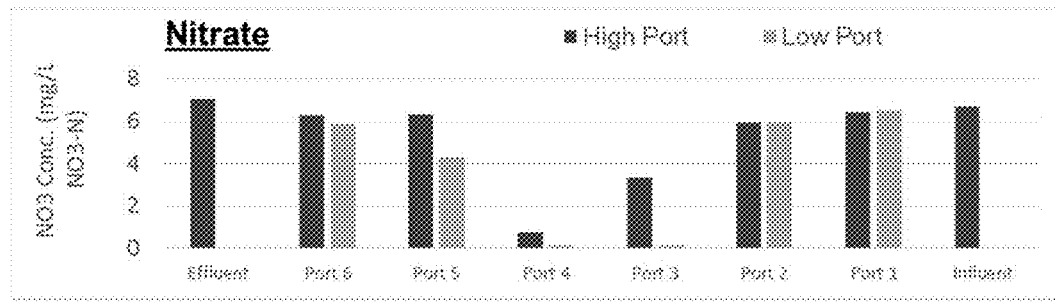
FIGS. 8A, 8B, and 8C are graphs of results from tank studies.
Figure 8B:
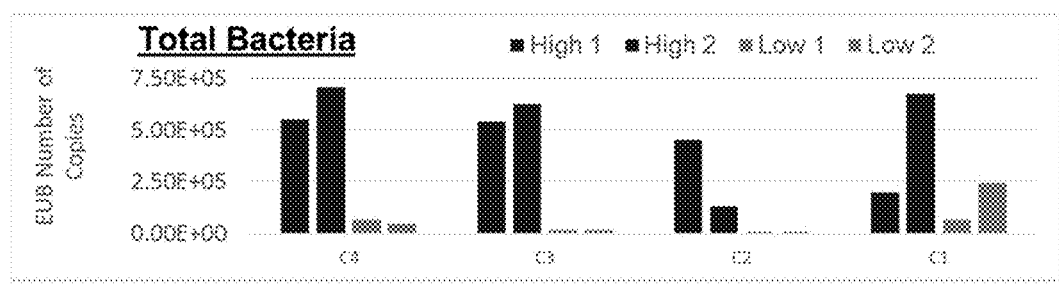
Figure 8C:
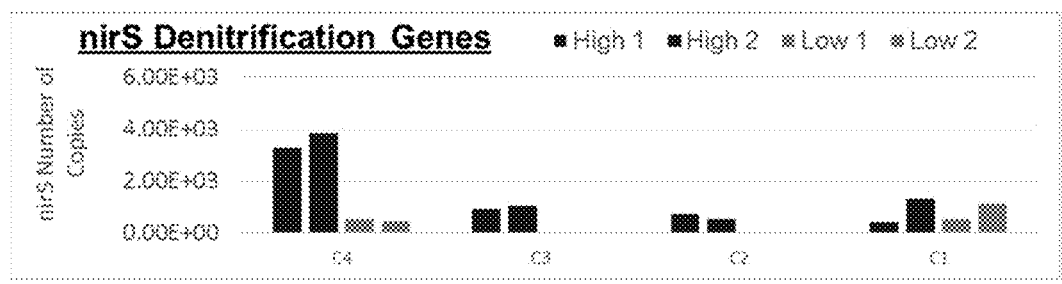

Results from these studies are shown in graph form at FIGS. 8A-8C. FIG. 8A is a graph of the nitrate concentrations take from the sample ports, with ports 3 and 4 showing significant denitrification. Ammonia and nitrite concentrations were either very low or below detection limit for all ports, indicating the loss of nitrate is likely not due to conversion to ammonia or nitrite. FIG. 8B shows the relative abundance of bacteria, based on number of copies of the 16S gene, found at specific coupon positions and depths. These studies indicate that a denser bacterial community exists in the upper 6 cm of the sediment (high coupon). With the exception of sample C1 high, replicate 2, the bacteria community increases as it approaches the end of the system. FIG. 8C shows the number of denitrification genes identified at various coupons, specifically the number of nirS gene copies at the various positions and depths. These results indicate a higher level of nirS denitrification gene expression in the effluent zone than in the BEST zone (C2 and C3). Also, qPCR data showed nirS is more abundant in the system than nirK genes (data not shown).

These results show that nitrate concentrations within BEST were substantially lower than in the influent water and upstream hyporheic zone. This shows that the BEST module was removing nitrate from the water. Other data (not shown) also show that the loss of nitrate was not due to conversion to other N species. Interestingly, the downstream hyporheic sediment also showed some N attenuation, this may be due to excess organic carbon leaching from the woodchips contained within the BEST module. The present design may result in sub-optimal performance of the scale experiment. For example, these studies used a high flow rate in the tank relative to the flow capacity of a single BEST module. Although nirS genes were a small fraction of the total bacteria (16s) genes present, they may explain the observed attenuation of nitrate.

Conclusions:

This project investigated the treatment capabilities of the BEST by combining qPCR and nitrogen testing, which complemented previous work with tracer tests and computer modeling. This work importantly demonstrated that hyporheic flowpaths within BEST modules can attenuate nitrate concentrations. The presence of denitrifying genes in the module also provides evidence of the potential pathway of this attenuation. This approach also provided a fuller understanding of the spatial variation of microbes in the BEST and the nitrate removal capabilities. Results will be used to fine tune and prepare the BEST modules for pilot implementation. Pilot scale systems will prove the efficacy of the BEST in restoration efforts.

Example 3—Column Studies

Methods

Columns—

Figure 9:
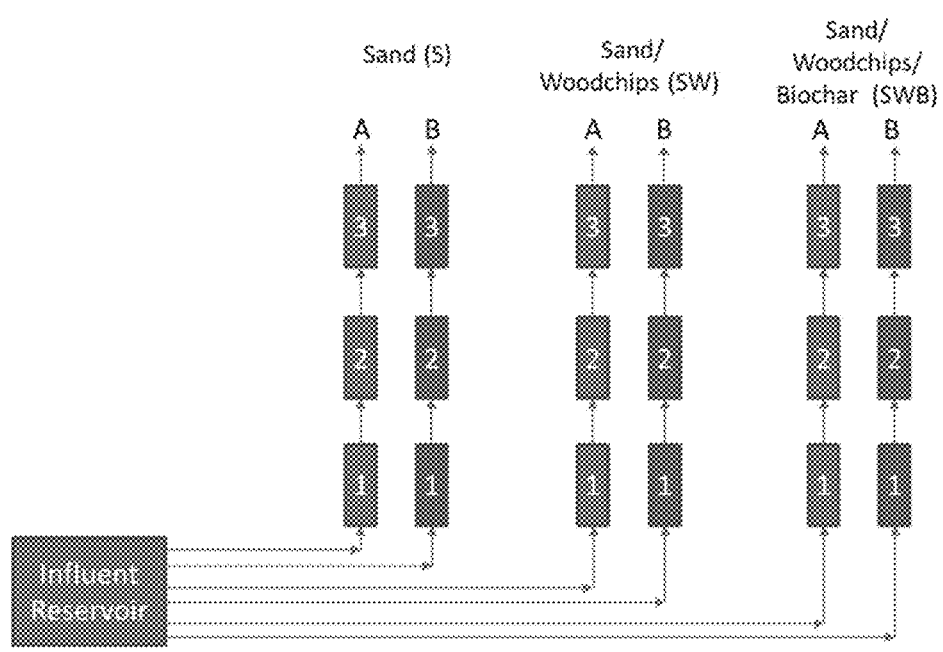
FIG. 9 is a schematic drawing of the geomedia column experiment setup. Duplicate columns of sand; sand and woodchips; sand, woodchips, and biochar; were each subdivided into three sub-columns. Columns were dosed with stormwater and kept saturated under continuous upflow conditions.

For these experiments, six columns were prepared: two control columns containing only sand, two columns containing sand and woodchips (10% by weight), and two columns containing sand, woodchips (10% by weight) and biochar (2% by weight). The columns were composed of three different sub-column sections connected by tubing to allow for samplings at three different locations within each column. Duplicate columns were designated as A and B columns, and each section was assigned a number indicating whether it was the first, second or third sub-column in series. The column setup is presented in FIG. 9.

Prior to packing the columns, the sand was rinsed and dried to remove fine particles. Biochar was passed through a sieve to remove particles smaller than 200 μm and rinsed and dried to remove fines. Woodchips were broken up into small pieces and passed through a 6.3 mm sieve to remove larger particles.

Tracer Tests—

Columns were purged with carbon dioxide and saturated with deionized water. After saturation, a tracer test was performed on the columns to help identify if there was preferential flow occurring through any of the columns. KBr solution was used as a tracer, with EC probes used to measure the conductivity of the influent reservoir and the effluent from the final section of each column. Effective porosities, flow rates and residence times for each column are presented in Table 5. Effective Porosities and Column Residence Times (hr). Residence times were about 2 to 5 hours shorter in the sand columns (S) than the sand/woodchip (SW) and sand/woodchip/biochar (SWB) columns.

TABLE 5

Effective Porosities and Column Residence Times (hr)

| | Sand-A | Sand-B | Sand/Woodchips-A | Sand/Woodchips-B | Sand/Woodchips/Biochar-A | Sand/Woodchips/Biochar-B |
|---|---|---|---|---|---|---|
| Porosity | 0.31 | 0.30 | 0.37 | 0.34 | 0.38 | 0.38 |
| RT (hr) | 17.7 | 16.2 | 19.3 | 19.3 | 19.6 | 21.4 |
| Average Column Flow Rate(m L/min) | 0.09 | 0.10 | 0.09 | 0.09 | 0.10 | 0.09 |

Influent Stormwater—

Local stormwater collected at Mines Park was used as influent for the system. Collected stormwater was passed through a 500 μm sieve to remove large particles prior to being passed through the columns. Two separate batches of stormwater were used during column operation. Each batch was sampled for influent concentrations of nitrate, ammonium, nitrite, metals and pathogen indicators. After tracer tests were performed, columns were started on stormwater on March 10$^{th}$.

Sample Collection—

Influent samples were collected from each batch of stormwater ran through the system. Effluent samples were collected on five dates between March 13th and April 8$^{th}$. Additional samples for nitrogen species (nitrate, ammonia and nitrite) were collected from April 22$^{nd}$ to April 25$^{th}$. Based on residence times determined through the tracer tests, initial effluent samples were taken on March 13$^{th}$ and after that samples were collected every Wednesday for four weeks. Effluent samples were collected from the effluent of each section in every columns, beginning with the last section and ending with the first section. Samples from the first and middle sections were collected but not analyzed for the first five sampling events, but were frozen and stored for later analysis if needed. All samples were analyzed for the sixth set of effluent samples collected. Nutrient samples were filtered (0.7 µm nominal pore size, Whatman GF/F). Metals samples were filtered using 0.45 µm nominal pore size filters. Samples for pathogen indicators were not filtered, and were immediately prepped according to procedures for Colilert testing at 1:1, 1:10 and 1:100 dilutions for the influent stormwater and 1:10 and 1:100 for column effluent. A 1:1 dilution was not performed for the column effluent due to the low flow rates through the columns and difficulty associated with collecting 100 mL of sample. Additionally, due to low flow rates through the columns, duplicate effluent samples were not collected.

Sample Analysis—

Nitrate, ammonium and nitrite analysis was performed using Hach kits. Metal were tested by being acidified to pH 2 and analyzed using Inductive Coupled Plasma (ICP). Pathogen indicators (coliforms, *E. coli*) were analyzed using the Colilert MPN method with Quantitray kits. These samples were prepared following standard methods and incubated at ~35° C. for 24 hours.

Results

Nitrogen Species—Nitrate, Ammonium and Nitrite

Influent nitrate concentrations in the three batches of influent stormwater ranged from 0.31 mg/L to 1.49 mg/L. Influent ammonium and nitrite concentrations were below the range of the low range Hach kits in both batches. Influent nitrate, ammonium and nitrite concentrations are listed in Table 6.

Effluent nitrate concentrations from the columns were generally near or below the low range of the Hach kit (Range: 0.23 mg/L to 13.50 mg/L). Nitrate concentrations from the sand columns fell outside of the analysis range after the first sampling event, whereas the sand/woodchip and sand/woodchip/biochar effluent concentrations were generally near the low end of the range, although concentrations from the fourth sampling event fell outside the range.

Figure 10A:
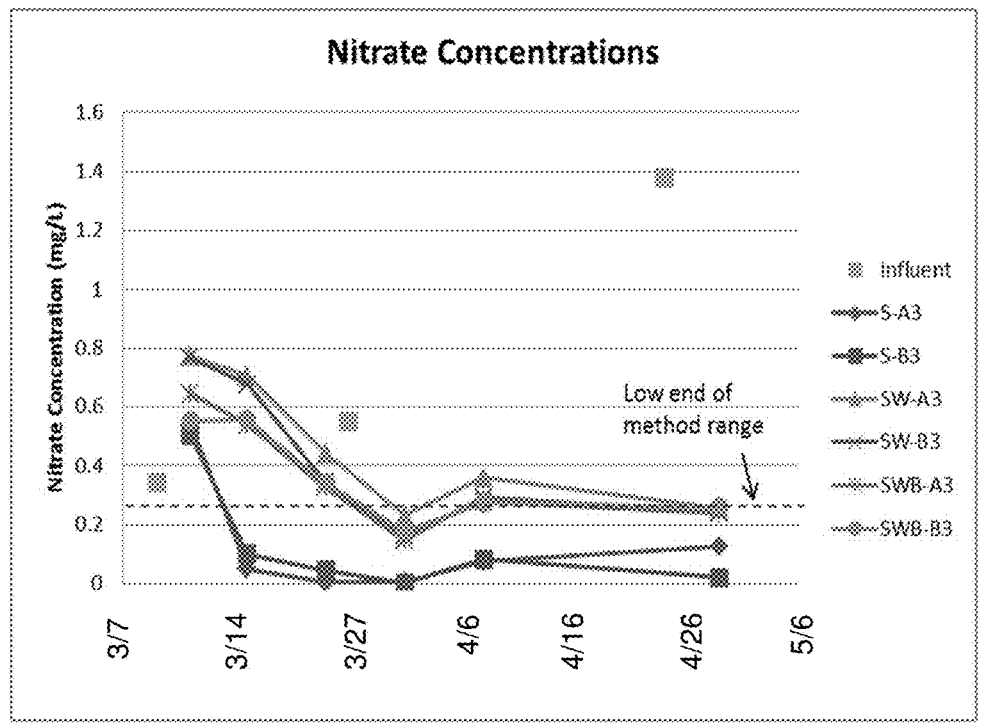
FIGS. 10A and 10B show nitrate concentrations in the influent stormwater and in the various column effluents over time.
Figure 10B:
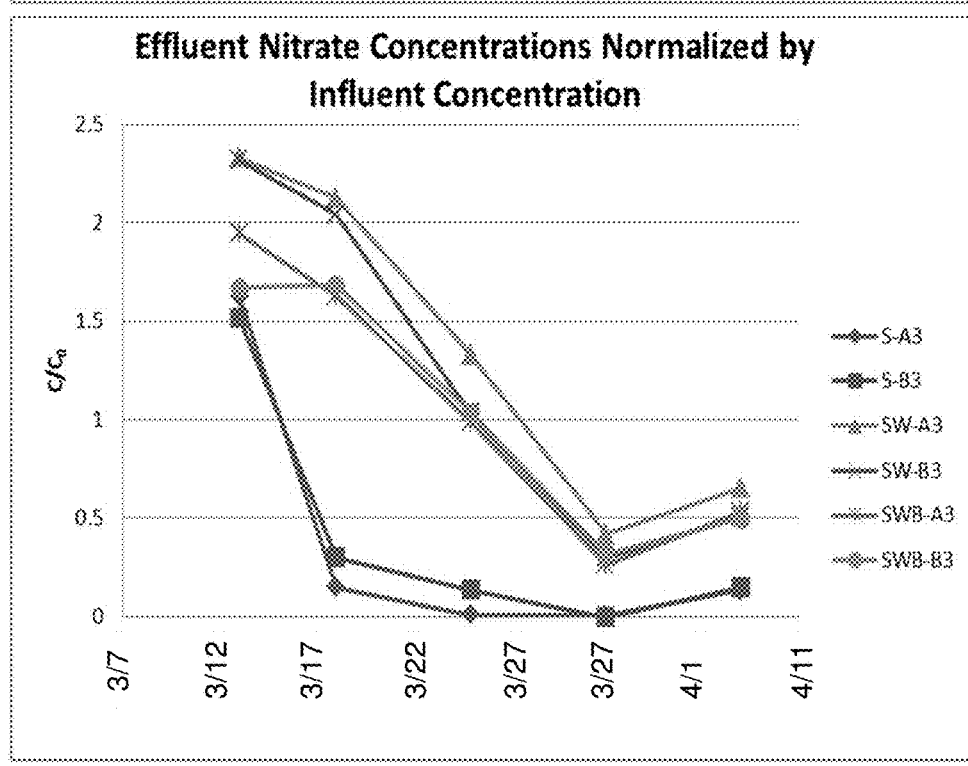
Figure 11A:
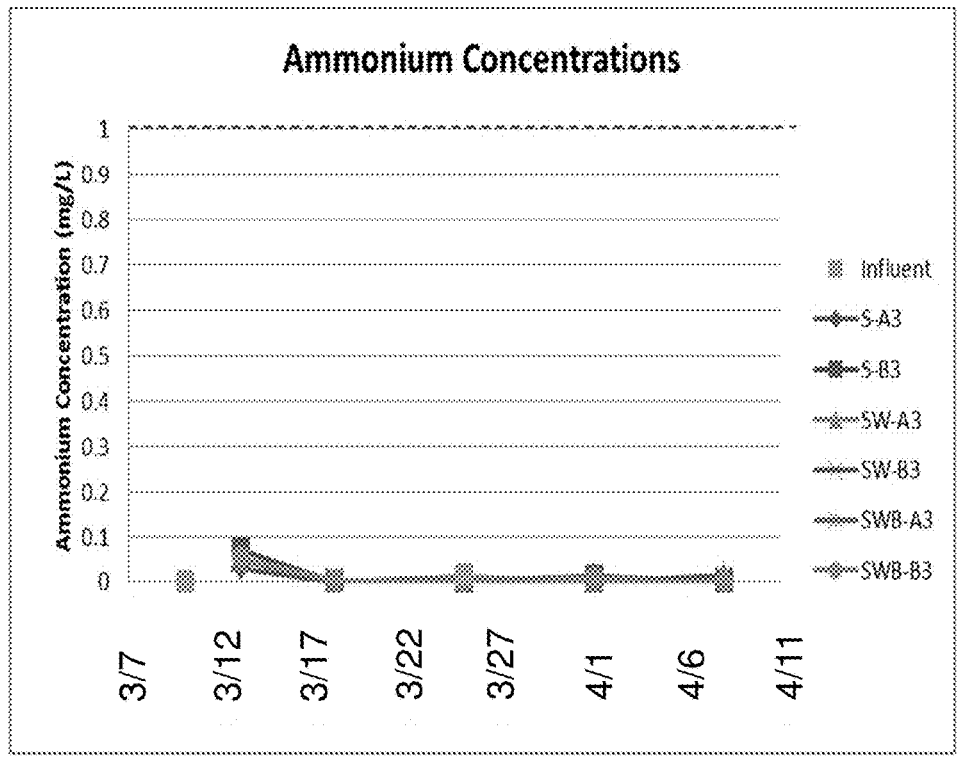
FIGS. 11A and 11B show ammonia concentrations in the influent stormwater and in the various column effluents over time.

The effluent nitrate concentrations in the sand columns decreased more quickly than either the sand/woodchip or sand/woodchip/biochar columns, although concentrations in the other two column types generally decreased over the sampling period. Influent and effluent nitrate concentrations are presented in FIG. 10A. Effluent nitrate concentrations normalized by the influent nitrate concentration is shown FIG. 10B. FIG. 10A shows absolute concentrations, whereas FIG. 10B shows effluent concentrations normalized to influent concentrations. "S" shows sand only columns, "SW" refers to sand and woodchip columns, and "SWB" refers to sand, woodchip, and biochar columns. "A" and "B" refer to duplicates of each column, and the "3" identifies that the effluent is from the terminal sub-column. This notation also applies to FIGS. 11A-B through 12.

Based on the sixth sampling event, it was determined that denitrification was occurring mostly in the first column section. In light of this, first order reaction rates for nitrate

TABLE 6

Nitrate, Ammonium and Nitrite Concentrations (mg/L) in Influent Stormwater.

| | Nitrate | | | Ammonium | | | Nitrite | | |
|---|---|---|---|---|---|---|---|---|---|
| Sample | 3/10 | 3/25 | 4/24 | 3/10 | 3/25 | 4/24 | 3/10 | 3/25 | 4/24 |
| Replicate 1 | 0.342 | 0.549 | 1.33 | 0 | 0.016 | 0 | 0 | 0 | 0 |
| Replicate 2 | 0.313 | N/A | 1.32 | 0.001 | N/A | 0 | 0 | N/A | N/A |
| Replicate 3 | 0.336 | N/A | 1.49 | 0.014 | N/A | 0 | 0 | N/A | N/A |

Final effluent nitrogen samples were analyzed for all six effluent sampling events for nitrate, ammonium and nitrite. Effluent nitrogen samples from the first and middle sections were not analyzed for the first five sampling events, but were stored frozen for later analysis if needed. Samples from all sections were analyzed for the sixth sampling event.

removal in the first section of each column were calculated and the results are presented in Table 7 along with first order reaction rates reported by Gomez et al. (2012) and Robertson (2010). Reaction rates were an order of magnitude higher than those reported in the literature.

TABLE 7

Calculated Nitrate Reaction Rate Constants for Nitrate Removal for Each Column and Other Reported Reaction Rates

| | Column | | | | | | Literature Values | |
|---|---|---|---|---|---|---|---|---|
| | S-A1 | S-B1 | SW-A1 | SW-B1 | SWB-A1 | SWB-B1 | k (hr$^{-1}$) | Geomedia |
| RT (hr) | 5.9 | 5.4 | 6.4 | 6.4 | 6.5 | 7.1 | | |
| K (hr$^{-1}$) | 0.48 | 0.82 | 0.36 | 0.29 | 0.36 | 0.32 | 0.038 | None (in situ sediments)[a] |
| | | | | | | | 0.092 | Woodchips[b] |

Figure 11B:
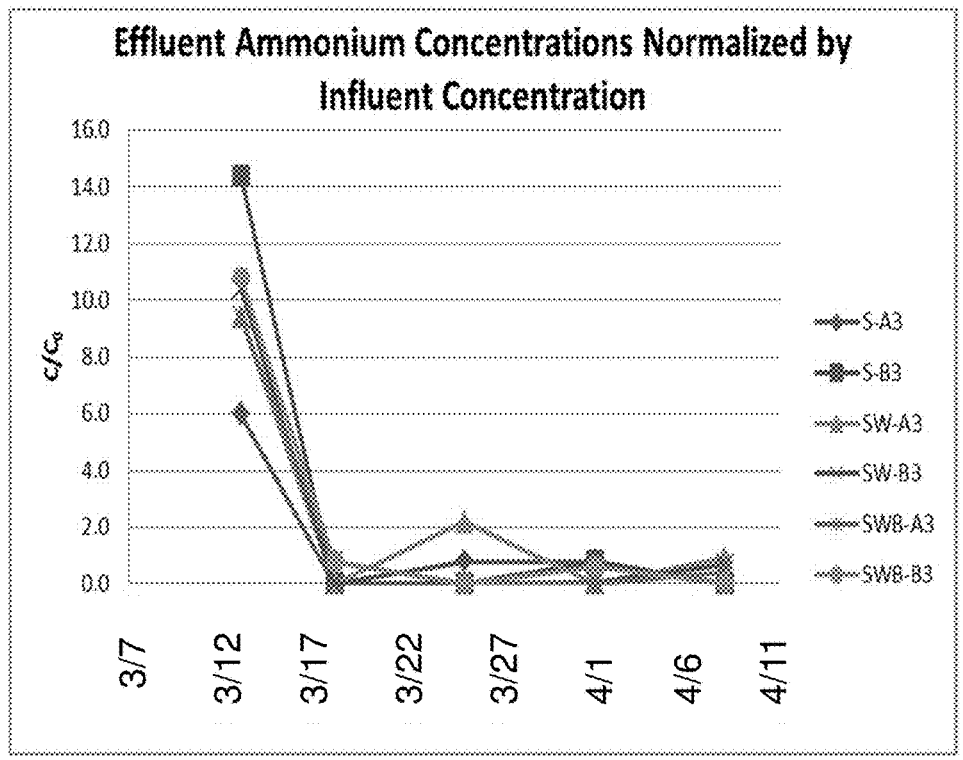
Figure 12:
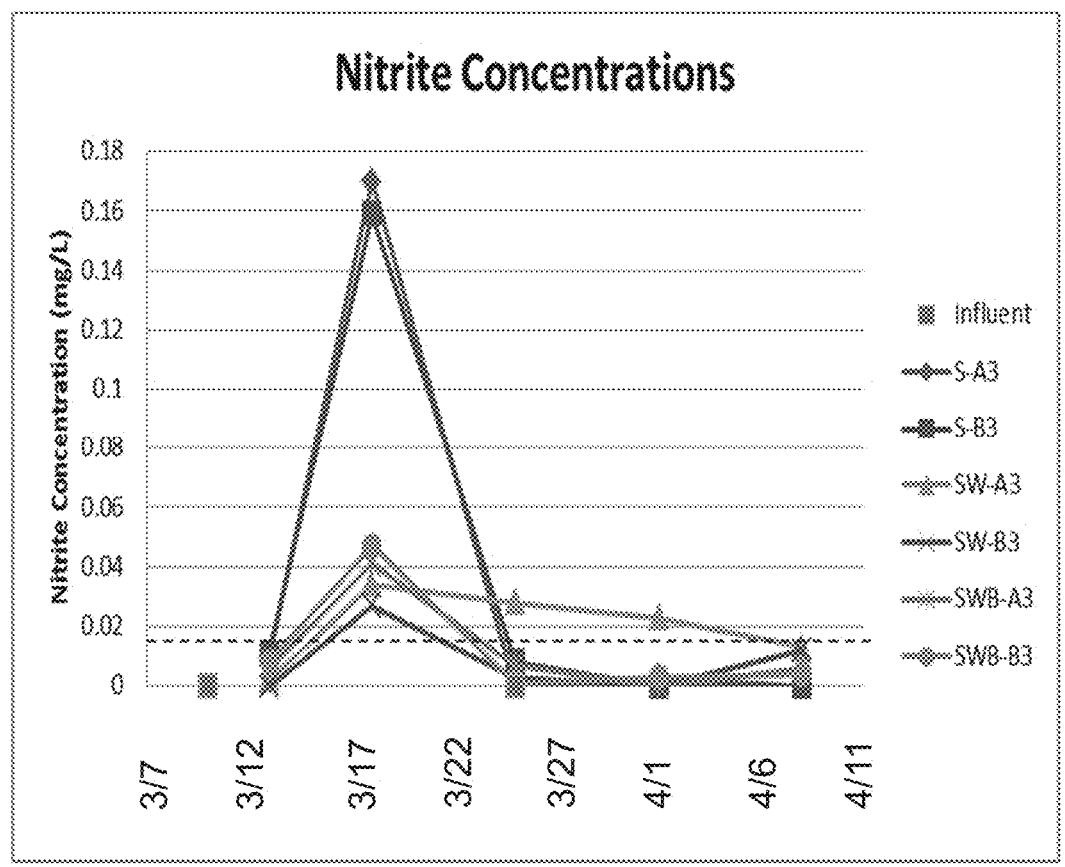
FIG. 12 shows absolute nitrite concentrations in the influent and effluent of various columns over time.

Effluent ammonium concentrations from the columns were always below the low range of the Hach kit (Range: 1 mg/L to 12 mg/L). The effluent ammonium concentrations were similar in the effluent from all columns. Influent and effluent ammonium concentrations are presented in FIG. 11(a). Effluent ammonium concentrations normalized by the influent ammonium concentration is shown in FIG. 11(b).

Effluent nitrite concentrations from the columns were generally below the low range of the Hach kit (Range: 0.015 mg/L to 0.6 mg/L). A spike in nitrite concentrations was observed in both sand columns in the second week of sampling, but after that, effluent nitrite concentrations were below 0.015 mg/L in most columns. Influent and effluent nitrite concentrations are presented in FIG. 12.

Metals—

Metals concentrations observed in the influent stormwater from Mines Park were generally as expected and consistent with a previous characterization.

TABLE 8

Detected Metals Concentrations (mg/L) in Influent Stormwater

| Analyte Name | DL (mg/l) | Mar. 10, 2015 Influent Replicate 1 | Replicate 2 | Mar. 25, 2015 Influent |
|---|---|---|---|---|
| As 188.979-A* | 0.0042 | 0.0156 | 0.0193 | 0.0175 |
| B 249.772-R | 0.0070 | 0.0276 | 0.0166 | 0.0221 |
| Ba 233.527-A* | 0.0001 | 0.1328 | 0.1317 | 0.1322 |
| Be 313.107-R | 0.0001 | BDL | 0.0002 | 0.0002 |
| Ca 315.887-R* | 0.0047 | 69.5111 | 70.9215 | 70.2163 |
| Cd 214.440-A | 0.0003 | 0.0007 | 0.0007 | 0.0007 |
| Co 228.616-A | 0.0003 | 0.0017 | 0.0012 | 0.0014 |
| Cr 205.560-A | 0.0003 | BDL | 0.0005 | 0.0005 |
| Cu 324.752-A | 0.0004 | 0.0025 | 0.0019 | 0.0022 |
| Fe 238.204-A | 0.0003 | 0.0420 | 0.0415 | 0.0418 |
| K 766.490-R | 0.0404 | 2.1832 | 2.1797 | 2.1815 |
| Li 670.784-R | 0.0007 | 0.0146 | 0.0153 | 0.0149 |
| Mg 279.553-R | 0.0001 | 21.7202 | 21.8577 | 21.7890 |
| Mg 285.213-R | 0.0013 | 21.8405 | 22.2380 | 22.0393 |
| Mn 257.610-A* | 0.0003 | 0.4634 | 0.4464 | 0.4549 |

TABLE 8-continued

Detected Metals Concentrations (mg/L) in Influent Stormwater

| Analyte Name | DL (mg/l) | Mar. 10, 2015 Influent Replicate 1 | Replicate 2 | Mar. 25, 2015 Influent |
|---|---|---|---|---|
| Na 589.592-R | 0.0065 | 63.1733 | 62.2174 | 62.6953 |
| Ni 231.604-A | 0.0004 | 0.0023 | 0.0022 | 0.0023 |
| P 177.434-A | 0.0083 | 0.0530 | 0.0214 | 0.0372 |
| S 180.669-A | 0.0058 | 14.3390 | 14.1857 | 14.2623 |
| Si 251.611-A* | 0.0114 | 6.1597 | 6.0607 | 6.1102 |
| Sr 407.771-R* | 0.0001 | 0.3627 | 0.3560 | 0.3594 |
| Zn 213.857-A | 0.0004 | 0.0190 | 0.0184 | 0.0187 |
| Mo 202.031 | 0.0011 | 0.0049 | 0.0036 | 0.0043 |

TABLE 9

Non-detected Metals in Influent Stormwater and Their Detection Limits

| Analyte Name | DL | Influent Replicate 1 | Replicate 2 | Influent |
|---|---|---|---|---|
| Al 308.215-A | 0.0045 | BDL | BDL | BDL |
| Pb 220.353-A | 0.0018 | BDL | BDL | BDL |
| Sb 217.582 | 0.0022 | BDL | BDL | BDL |
| Se 196.026-A | 0.0061 | BDL | BDL | BDL |
| Sn 189.927 | 0.0005 | BDL | BDL | BDL |
| Ti 334.940 | 0.0001 | BDL | BDL | BDL |
| Tl 190.801-A | 0.0027 | BDL | BDL | BDL |
| V 292.402-A* | 0.0027 | BDL | BDL | BDL |

First order reaction rates for selected metals removal in each column were calculated and the results are presented in Table 10 along with first order reaction rates reported by Lee et al. (2004), Wilkin & McNeil (2003), Han et al. (2006), and Moraci & Calabrò (2010). Effluent concentrations of cadmium, chromium and lead were reduced below the detection limit. In order to calculate an apparent reaction constant, detection limit was assumed as effluent concentration.

TABLE 10

Calculated Reaction Rates for Selected Metals and Other Reported Reaction Rates

| | Column Reaction Rates (hr$^{-1}$) | | | | | | Literature Values | | |
|---|---|---|---|---|---|---|---|---|---|
| | S-A3 | S-B3 | SW-A3 | SW-B3 | SWB-A3 | SWB-B3 | k (hr$^{-1}$) | Ideal Mean RT(hr) | Geomedia |
| RT (hr) | 17.7 | 16.2 | 19.3 | 19.3 | 19.6 | 21.4 | | | |
| As | −0.028 | −0.084 | −0.022 | −0.036 | −0.050 | −0.058 | 0.250 | 4.0 | Zero valent iron[d] |
| Cd | 0.042* | 0.036 | 0.038* | 0.038* | 0.037* | 0.034* | 0.120 | 8.3 | Zero valent iron[d] |
| Cr | 0.032* | 0.035* | 0.029* | 0.029* | 0.028* | 0.026* | | | |
| Cu | −0.006 | 0.046 | 0.053 | 0.053 | 0.055 | 0.053 | 0.019 | 52.6 | Mn-oxide sands[e] |
| | | | | | | | 0.270 | 3.7 | Zero valent iron[d] |
| Ni | −0.021 | −0.034 | −0.025 | −0.039 | −0.048 | −0.010 | 0.606 | 1.7 | Zero valent iron[f] |
| | | | | | | | 0.197 | 5.1 | Zero valent iron/pumice mix[f] |
| | | | | | | | 0.080 | 12.5 | Zero valent iron[d] |
| Pb | 0.028* | 0.030* | 0.025* | 0.025* | 0.025* | 0.023* | 0.018 | 55.6 | Mn-oxide sands[e] |
| Zn | −0.062 | 0.017 | 0.029 | 0.025 | 0.027 | 0.023 | 0.040 | 25.0 | Green Sands[e] |
| | | | | | | | 0.070 | 14.3 | Zero valent iron[d] |

*Effluent concentration reduced below detection limit, rate constant calculated assuming effluent concentration was detection limit
[c]Lee et al. (2004), [d]Wilkin & McNeil (2003), [e]Han et al. (2006), [f]Moraci & Calabrò (2010)

Pathogen Indicators—

Coliforms were present in both batches of influent in high concentrations (Table 11). *E. coli* was not detected in the first batch of influent stormwater and was present at low concentration in the second batch. The 1:1 dilution was out of the range for this method for both batches of stormwater and the concentration is noted as greater than 2,420 cfu/100 mL for this dilution. The concentration of coliforms in the second batch of stormwater was about twice as high as the first batch.

TABLE 11

Coliforms and *E. coli* concentrations (cfu/100 mL) in Influent Stormwater.

| Influent | | Coliform Large Wells | Coliform Small wells | Coliform MPN (cfu/100 mL) | *E. coli* Large Wells | *E. coli* Small wells | *E. coli* MPN (cfu/100 mL) |
|---|---|---|---|---|---|---|---|
| 3/13 | 1:1 | 49 | 48 | >2419.6 | 0 | 0 | 0 |
|  | 1:10 | 49 | 28 | 5475 | 0 | 0 | ND |
|  | 1:100 | 33 | 4 | 5830 | 0 | 0 | ND |
| 3/27 | 1:1 | 49 | 49 | >2419.6 | 0 | 2 | 2 |
|  | 1:10 | 49 | 44 | 15531 | 0 | 0 | ND |
|  | 1:100 | 42 | 5 | 9600 | 0 | 0 | ND |

The concentration of coliforms in the effluent from both sand columns decreased during the first three sampling events (Table 12). Due to the large volume requirement for the 1:1 dilution (100 mL), 1:1 dilutions were not performed and it is not known whether or not coliforms were present at concentrations below the range of the 1:10 dilution. Coliforms were detected again at the 1:10 and 1:100 dilutions during the fourth sampling event and decreased the following week. *E. coli* was not detected for 1:10 or 1:100 dilutions for any sampling event.

TABLE 12

Coliforms Concentration (cfu/100 mL) in Effluent from Sand Columns

| Column Effluent | | S-A3 | | | S-B3 | | |
|---|---|---|---|---|---|---|---|
| Date | Dilution | Coliform Large Wells | Coliform Small wells | Coliform MPN (cfu/100 mL) | Coliform Large Wells | Coliform Small wells | Coliform MPN (cfu/100 mL) |
| 3/12 | 1:10 | 23 | 3 | 341 | 49 | 16 | 2755 |
|  | 1:100 | N/A | N/A | N/A | N/A | N/A | N/A |
| 3/18 | 1:10 | 0 | 0 | ND | 0 | 0 | ND |
|  | 1:100 | 0 | 0 | ND | 1 | 0 | 100 |
| 3/25 | 1:10 | 0 | 0 | ND | 0 | 0 | ND |
|  | 1:100 | 0 | 0 | ND | 0 | 0 | ND |
| 4/1 | 1:10 | 49 | 48 | >24196 | 49 | 48 | >24196 |
|  | 1:100 | 49 | 20 | 34480 | 49 | 39 | 104620 |
| 4/8 | 1:10 | 43 | 8 | 1112 | 49 | 36 | 8664 |
|  | 1:100 | 7 | 0 | 750 | 27 | 7 | 3730 |

The concentration of coliforms in the effluent from all sand/woodchips (Table 13) and sand/woodchips/biochar (Table 14) columns increased during the sampling period. In these cases, exact coliforms concentrations are not known because the results of both 1:10 and 1:100 dilutions were out of range for all sampling events. Concentrations are noted to be greater than 241,960 cfu/100 mL, the upper limit of the 1:100 dilution. *E. coli* was not detected at either the 1:10 or 1:100 dilution for all columns. First order reaction rate constants for coliforms were calculated and are presented in Table 15.

TABLE 13

Coliforms Concentrations (cfu/100 mL) in Effluent from Sand/woodchips Columns

| | | SW-A3 | | | SW-B3 | | |
|---|---|---|---|---|---|---|---|
| Column Effluent | | Coliform Large | Coliform Small | Coliform MPN | Coliform Large | Coliform Small | Coliform MPN |
| Date | Dilution | Wells | wells | (cfu/100 mL) | Wells | wells | (cfu/100 mL) |
| 3/12 | 1:10 | 49 | 48 | >24196 | 49 | 48 | >24196 |
| | 1:100 | N/A | N/A | N/A | N/A | N/A | N/A |
| 3/18 | 1:10 | 49 | 48 | >24196 | 49 | 48 | >24196 |
| | 1:100 | 49 | 48 | >241960 | 49 | 48 | >241960 |
| 3/25 | 1:10 | 49 | 48 | >24196 | 49 | 48 | >24196 |
| | 1:100 | 49 | 48 | >241960 | 49 | 48 | >241960 |
| 4/1 | 1:10 | 49 | 48 | >24196 | 49 | 48 | >24196 |
| | 1:100 | 49 | 48 | >241960 | 49 | 48 | >241960 |
| 4/8 | 1:10 | 49 | 48 | >24196 | 49 | 48 | >24196 |
| | 1:100 | 49 | 48 | >241960 | 49 | 48 | >241960 |

TABLE 14

Coliforms Concentrations (cfu/100 mL) in Effluent from Sand/woodchips/biochar Columns

| | | SWB-A3 | | | SWB-B3 | | |
|---|---|---|---|---|---|---|---|
| Column Effluent | | Coliform Large | Small | Coliform MPN | Coliform Large | Small | Coliform MPN |
| Date | Dilution | Wells | Wells | (cfu/100 mL) | Wells | Wells | (cfu/100 mL) |
| 3/12 | 1:10 | 49 | 48 | >24196 | 49 | 48 | >24196 |
| | 1:100 | N/A | N/A | N/A | N/A | N/A | N/A |
| 3/18 | 1:10 | 49 | 48 | >24196 | 49 | 48 | >24196 |
| | 1:100 | 49 | 48 | >241960 | 49 | 48 | >241960 |
| 3/25 | 1:10 | 49 | 48 | >24196 | 49 | 48 | >24196 |
| | 1:100 | 49 | 48 | >241960 | 49 | 48 | >241960 |
| 4/1 | 1:10 | 49 | 48 | >24196 | 49 | 48 | >24196 |
| | 1:100 | 49 | 48 | >241960 | 49 | 48 | >241960 |
| 4/8 | 1:10 | 49 | 48 | >24196 | 49 | 48 | >24196 |
| | 1:100 | 49 | 48 | >241960 | 49 | 48 | >241960 |

TABLE 15

Calculated First Order Reaction Rate for Removal of Coliforms for Each Column.

| | Column | | | | | |
|---|---|---|---|---|---|---|
| | S-A3 | S-B3 | SW-A3 | SW-B3 | SW B-A3 | SWB-B3 |
| RT (hr) | 17.7 | 16.2 | 19.3 | 19.3 | 19.6 | 21.4 |
| k (hr$^{-1}$) | 0.147 | 0.044 | −0.154 | −0.154 | −0.151 | −0.138 |

Discussion

For all sampling events following the initial sampling, all columns were effective in attenuating the nitrate concentration present in the influent. The control columns were very effective during the month of column operation performed for this project, with calculated first order removal rate constants of 0.48 to 0.82 hr$^{-1}$ as compared to the test columns with removal rates ranging from 0.29 to 0.36 hr$^{-1}$. There was not a notable difference in nitrate removal performance between the sand/woodchip and sand/woodchip/biochar columns. Although the control columns outperformed the test columns (noting that measured nitrate concentrations were generally below the range of the test method), this may be attributed to the inherent difficulties in startup of biological removal processes. It is possible that a denitrifying community developed more quickly in the sand only columns and that the test columns would have shown comparable or better performance if operated longer. Ammonia concentrations in the influent were low and nitrite was not detected. Effluent concentrations of ammonia and nitrite were similarly low and generally below the low end of the method range. Denitrification occurred mostly in the first section of each column.

Reaction rates for metals varied, although were typically within the same order of magnitude for metals evaluated and reaction rates for removal were similar regardless of geomedia used in this study. Metals that experienced overall removal through the columns included cadmium, chromium, copper, lead and zinc with first order reaction rate constants ranging from 0.017 to 0.053 hr$^{-1}$. Calculated reaction rates were generally slightly higher for the sand columns, with the exception of copper and zinc, where slightly higher reaction rates were observed for sand/woodchips and sand/woodchips/biochar columns. It should be noted that the reaction rates calculated for cadmium, chromium and lead were apparent as the effluent concentration for these metals was reduced below the detection limit, therefore actual rate constants may be higher. For some metals, including arsenic and nickel, overall generation of metals was observed.

Reaction rates for overall generation were not as consistent between geomedia type as reaction rates for overall removal, but were within the same order of magnitude.

The sand only columns were the effective in achieving overall removal of pathogen indicators during the study period with first order removal rates of 0.044 and 0.147 hr$^{-1}$ for the two columns. Significant removal of coliforms occurred during the first three weeks of column operation before breakthrough was observed by increased concentrations in the effluent from both columns for the fourth sampling event. At the fifth and final sampling event, coliform concentration in the effluent were once more reduced before the influent concentration, suggesting possible development of biofilm in the sand that lead to net removal of coliforms by predation.

The results of this study indicate that neither the addition of woodchips or woodchips and biochar to sand at the ratios considered (10% by weight for woodchips and 2% by for biochar) led to enhanced nitrate, metals or coliforms removal in this particular benchtop setting. However, the relative performance of woodchip and biochar geomedia could be greater under other conditions, such as higher influent nitrate, or lower influent dissolved organic carbon concentrations. Limitations of this work include the limited operation of the columns with regard to denitrifying community development in the four test columns. It is possible that with longer operation time the test columns would show comparable or improved removal relative to the sand columns. Removal rate constants for copper and zinc were also slightly higher in all four test columns than the control sand columns, but this different was not significantly.

All references disclosed herein, whether patent or nonpatent, are hereby incorporated by reference as if each was included at its citation, in its entirety.

Although the present disclosure has been described with a certain degree of particularity, it is understood the disclosure has been made by way of example, and changes in detail or structure may be made without departing from the spirit of the disclosure as defined in the appended claims.

We claim:

1. An engineered streambed module for positioning below a stream surface in a native streambed, the module comprising:
   an upstream block of low hydraulic conductivity material;
   a downstream block of low hydraulic conductivity material; and
   at least one intermediate block positioned between the upstream block and the downstream block, wherein the upstream block has a hydraulic conductivity less than the hydraulic conductivity of the native streambed, and the intermediate block has a hydraulic conductivity that is equal to or greater than the hydraulic conductivity of the native streambed, and wherein a top side of at least one of the upstream block and the downstream block is positioned at or near the surface of the streambed.

2. The engineered streambed module of claim 1, comprising a bottom layer in contact with the upstream and the downstream blocks and at least one intermediate block, wherein the bottom layer comprises a water impervious material.

3. The engineered streambed module of claim 2, wherein the intermediate block comprises at least one geomedia selected from iron filings, zero-valent iron, ash, green sands, metal-oxide coated sands/sediments, pumice, organic-carbon based residuals, inorganic-carbon based media, zeolite, surfactant-modified zeolite, water/wastewater treatment residuals, and combinations thereof.

4. The engineered streambed module of claim 2, wherein the intermediate block comprises a plurality of sub-blocks defining an upper sub-block and lower sub-block, the lower sub-block having a hydraulic conductivity that is greater than the hydraulic conductivity of the upper sub-block and/or the hydraulic conductivity of the native streambed.

5. The engineered streambed module of claim 1, wherein the intermediate block comprises at least one geomedia selected from iron filings, zero-valent iron, ash, green sands, metal-oxide coated sands/sediments, pumice, organic-carbon based residuals, inorganic-carbon based media, zeolite, surfactant-modified zeolite, water/wastewater treatment residuals, and combinations thereof.

6. The engineered streambed module of claim 1, wherein the intermediate block comprises a plurality of sub-blocks.

7. The engineered streambed module of claim 6, wherein the sub-blocks define an upper sub-block and lower sub-block, the lower sub-block having a hydraulic conductivity that is greater than the hydraulic conductivity of the upper sub-block and/or the hydraulic conductivity of the native streambed.

8. An engineered streambed system comprising:
   one or more streambed modules, wherein the one or more streambed modules comprises;
   an upstream block of low hydraulic material;
   a downstream block of low hydraulic material; and
   at least one intermediate block positioned between the upstream bock and the downstream block, wherein the upstream block has a hydraulic conductivity less than the hydraulic conductivity of a native streambed into which the engineered streambed system is to be positioned, and wherein the intermediate block comprises at least one material with a hydraulic conductivity that is greater than that of the native streambed, and wherein a top side of at least one of the upstream block and the downstream block is positioned at or near the surface of the stream bed.

9. The engineered streambed system of claim 8, wherein the system comprises at least two modules, wherein the at least two modules are positioned in parallel in the native streambed.

10. The engineered streambed system of claim 8, wherein the system comprises at least two modules, wherein the at least two modules are positioned in series in the native streambed.

11. The engineered streambed system of claim 10, wherein a first module is an upstream module comprising a first upstream block and a first downstream block, and the second module is a downstream block comprising an upstream block that is the first downstream block and a second downstream block.

12. The engineered streambed system of claim 10, wherein the first module comprises a first upstream block and a first downstream block, and the second module comprises a second upstream block and a second downstream block, wherein the first downstream block is separated by the second upstream block by a length of native streambed.

13. A method of enhancing water quality in a stream comprising:
   placing the module of claim 1 in the streambed;
   allowing water with one or more contaminants to enter the module; and thereby
   enhancing the quality of the water in the stream upon exiting the module.

14. The method of claim 13, wherein the streambed is a natural streambed.

15. The method of claim 13, wherein the streambed is a man-made streambed.

16. The method of claim 13, wherein the streambed is an existing streambed and the method includes removing at least part of the existing streambed to allow the module to be placed in the streambed.

17. The method of claim 13, wherein the streambed is a concrete channel.

* * * * *